(12) United States Patent
Okuno et al.

(10) Patent No.: US 7,907,606 B2
(45) Date of Patent: Mar. 15, 2011

(54) MULTI-PLANE CELL SWITCH FABRIC SYSTEM

(75) Inventors: Michitaka Okuno, Kokubunji (JP); Mitsuo Yamamoto, Hino (JP); Isao Kimura, Yokohama (JP)

(73) Assignee: ALAXALA Networks Corporation, Kawasaki-shi (JP)

( * ) Notice: Subject to any disclaimer, the term of this patent is extended or adjusted under 35 U.S.C. 154(b) by 67 days.

(21) Appl. No.: 12/273,579

(22) Filed: Nov. 19, 2008

(65) Prior Publication Data

US 2009/0129393 A1 May 21, 2009

(30) Foreign Application Priority Data

Nov. 21, 2007 (JP) ................ 2007-301134

(51) Int. Cl.
*H04Q 11/00* (2006.01)
*H04L 12/56* (2006.01)
(52) U.S. Cl. ............... 370/388; 370/398; 370/414
(58) Field of Classification Search ........... 370/388, 370/395.1, 398, 414
See application file for complete search history.

(56) References Cited

U.S. PATENT DOCUMENTS

| 6,832,261 | B1 | 12/2004 | Westbrook et al. | |
|---|---|---|---|---|
| 2002/0061030 | A1* | 5/2002 | Iny | 370/449 |
| 2004/0141510 | A1 | 7/2004 | Blanc et al. | |
| 2004/0143593 | A1 | 7/2004 | Le Maut et al. | |
| 2005/0201400 | A1* | 9/2005 | Park et al. | 370/412 |
| 2007/0058602 | A1* | 3/2007 | Shimada | 370/340 |
| 2007/0248086 | A1* | 10/2007 | Petersen | 370/389 |
| 2008/0159149 | A1 | 7/2008 | Okuno | |

FOREIGN PATENT DOCUMENTS

| JP | 2008-092485 | 4/2008 |
|---|---|---|
| WO | 02/43329 A1 | 5/2002 |

OTHER PUBLICATIONS

F. Abel, "A Four Terabit Single Stage Packet Switch with Large Round-Trip Time Support," Dec. 10, 2002, High Performance Interconnects, 2002 Proceedings, pp. 5-14.*

* cited by examiner

*Primary Examiner* — Dang T Ton
*Assistant Examiner* — Ryan C. Kavleski
(74) *Attorney, Agent, or Firm* — Brundidge & Stanger, P.C.

(57) ABSTRACT

Cells which arrive in random sequence from the asynchronously operating exchange parts are restored into the original by a small amount of hardware. Distributing parts as inputs of a switch fabric manage serial numbers continuous for each destination. The distributing part divides an inputted variable length packet into fixed length cells, adds serial numbers corresponding to destinations to the cells, and outputs the cells to the exchange parts. The respective exchange parts deliver the cells to the objected destinations. Alignment parts as outputs of the switch fabric classify the reception cells by the number of the distributing part, and compare an expected serial number managed by the alignment part with a serial number of the destination (alignment part) of the reception cell. An identical one is stored in an aligned FIFO queue, and cells of from a packet start cell to a packet end cell are taken out.

6 Claims, 20 Drawing Sheets

| | | | | | | | | | | | | | | | | | | |
|---|---|---|---|---|---|---|---|---|---|---|---|---|---|---|---|---|---|---|
| DESTINATION 1 TO 6 | | | DESTINATION 2, 3 | | | | | | | DESTINATION 2 | | | DESTINATION 1, 3 | | | | DESTINATION 1 | |
| PACKET 5 | | | PACKET 4 | | | | | | | PACKET 3 | | | PACKET 2 | | | | PACKET 1 | PACKET |
| □ | □ | □ | □ | □ | □ | □ | □ | □ | □ | □ | □ | □ | □ | □ | □ | □ | □ | CELL |
| 11 | 10 | 9 | – | – | – | – | – | – | – | – | 8 | 7 | 6 | 5 | 4 | 3 | 2 | 1 | 0 | SERIAL NUMBER FOR DESTINATION 1 |
| 10 | 9 | 8 | 7 | 6 | 5 | 4 | 3 | 2 | 1 | 0 | – | – | – | – | – | – | – | – | SERIAL NUMBER FOR DESTINATION 2 |
| 13 | 12 | 11 | 10 | 9 | 8 | 7 | 6 | – | – | – | 5 | 4 | 3 | 2 | 1 | 0 | – | – | – | SERIAL NUMBER FOR DESTINATION 3 |
| 2 | 1 | 0 | – | – | – | – | – | – | – | – | – | – | – | – | – | – | – | – | SERIAL NUMBER FOR DESTINATION 4 |
| 2 | 1 | 0 | – | – | – | – | – | – | – | – | – | – | – | – | – | – | – | – | SERIAL NUMBER FOR DESTINATION 5 |
| 2 | 1 | 0 | – | – | – | – | – | – | – | – | – | – | – | – | – | – | – | – | SERIAL NUMBER FOR DESTINATION 6 |

FIG. 9

| | PACKET 5 (DESTINATION 1 TO 6) | PACKET 4 (DESTINATION 2, 3) | PACKET 3 (DESTINATION 2) | PACKET 2 (DESTINATION 1, 3) | PACKET 1 (DESTINATION 1) | |
|---|---|---|---|---|---|---|
| CELL | □□□□ | □□□□□□□ | □□□ | □□□□□□□□ | □□□ | |
| | – – – – | – – – – – – – | – – – | 8 7 6 5 4 3 2 1 0 | – – – | SERIAL NUMBER FOR DESTINATION 1 |
| | – – – – | 7 6 5 4 3 2 1 0 | – – – | – – – – – – – – | – – – | SERIAL NUMBER FOR DESTINATION 2 |
| | 2 1 0 | – – – – – – – | – – – | – – – – – – – – | – – – | SERIAL NUMBER FOR DESTINATION 1 & 2 |
| | – – – – | 10 9 8 7 6 – – | – – – | 5 4 3 2 1 0 – – – | – – – | SERIAL NUMBER FOR DESTINATION 3 |
| | – – – – | – – – – – – – | – – – | – – – – – – – – | – – – | SERIAL NUMBER FOR DESTINATION 4 |
| | 2 1 0 | – – – – – – – | – – – | – – – – – – – – | – – – | SERIAL NUMBER FOR DESTINATION 3 & 4 |
| | – – – – | – – – – – – – | – – – | – – – – – – – – | – – – | SERIAL NUMBER FOR DESTINATION 5 |
| | – – – – | – – – – – – – | – – – | – – – – – – – – | – – – | SERIAL NUMBER FOR DESTINATION 6 |
| | 2 1 0 | – – – – – – – | – – – | – – – – – – – – | – – – | SERIAL NUMBER FOR DESTINATION 5 & 6 |
| | – – – – | – – – – – – – | – – – | – – – – – – – – | – – – | SERIAL NUMBER FOR DESTINATION 7 |
| | – – – – | – – – – – – – | – – – | – – – – – – – – | – – – | SERIAL NUMBER FOR DESTINATION 8 |
| | – – – – | – – – – – – – | – – – | – – – – – – – – | – – – | SERIAL NUMBER FOR DESTINATION 7 & 8 |

FIG. 17

MULTI-PLANE CELL SWITCH FABRIC SYSTEM

CLAIM OF PRIORITY

The present application claims priority from Japanese patent application JP2007-301134 filed on Nov. 21, 2007, the content of which is hereby incorporated by reference into this application.

BACKGROUND OF THE INVENTION

1. Field of the Invention

The present invention relates to a multi-plane cell switch fabric system, and relates to a switch technique for dynamically and mutually connecting plural function blocks included in the inside of an apparatus such as a router, a server or a storage apparatus, and particularly to a multi-plane cell switch fabric system which uses plural independently operating switches and rearranges, when the arrival sequence of data is changed at a destination, the data in proper sequence.

2. Background Art

In a network transfer apparatus such as a router, a server apparatus, a storage apparatus to connect plural disk arrays, or the like, a switch fabric is used for performing data exchange between function blocks of the inside of the apparatus. The exchange capacity of the switch fabric is represented by the product of the number of ports and the port capacity (line speed), and in order to realize large capacity exchange, it is necessary to increase one of or both of the number of ports and the port capacity.

The number of ports can be increased by multistage-connecting element switches and by forming an omega network, a cross network, a fat-tree network or the like. Besides, although the port capacity of the switch fabric can be increased by increasing the port capacity of a switch LSI (Large Scale Integration), since the number of pins capable of being mounted on the LSI is limited by the mounting limit of the CMOS (Complementary MOS) of the times, when the large capacity port is realized, the number of ports per switch LSI is decreased.

Although the whole exchange capacity of the switch fabric can be increased by multistage-connecting the switch LSIs having a small number of large capacity ports, the following problems arise. That is, when the total number of ports is increased, the number of connection stages is increased, and there arise a problem that the latency for passing through the switch fabric becomes large. Besides, even when the destinations are different, collision occurs in the switch fabric and there arises a problem that the throughput is reduced. As a method of realizing an objective exchange capacity by avoiding these problems, a multi-plane cell switch fabric system (parallel packet switch) is known.

In the multi-plane cell switch fabric system, M relatively low speed switch LSIs each having a port with a capacity of 1/M of required capacity are prepared, input data is divided in a distributing part as an input of the switch fabric, is distributed to respective switches and is made to pass therethrough, so that desired large capacity exchange is realized. In general, in the case of a switch used for a network apparatus, input data is a variable length packet, and the packet is divided into fixed length units called cells.

When the multi-plane cell switch fabric system is constructed most easily, plural switch LSIs used for an exchange part are completely synchronized, and a completely identical destination adjustment operation is performed. Thus, since the cells arrive at a destination (output of the switch) in proper sequence at completely predictable timing, the packets can be easily restored, and further, the packet sequence in the flow can be easily restored.

However, in recent years, the port capacity and exchange capacity required for the switch become very large, and the speed of each switch LSI itself constituting the multi-plane cell switch fabric system is increased. For example, as communication between LSIs, high speed serial transmission called SerDes (SERialization/DE-Serialization) is used, and the exchange process pitch of a cell is also shortened, and accordingly, it is actually difficult to completely synchronize the respective switch LSIs. Thus, it is necessary to provide a multi-plane cell switch fabric system in which the respective switches operate asynchronously, that is, the respective switches independently perform data exchange.

Patent document 1: US 2004/0143593 (A1)
Patent document 2: WO 02/43329 (A1)
Patent document 3: U.S. Pat. No. 6,832,261 (B1)
Patent document 4: US 2004/0141510 (A1)

In the multi-plane cell switch fabric system in which the respective exchange parts asynchronously operate, it is not ensured that the transmission sequence of cells in a distributing part as an input of the switch fabric is coincident with the arrival sequence of the cells via the respective exchange parts in an alignment part as an output of the switch fabric. For example, a subsequent packet passing through a switch in a non-congestion state can overtake a preceding packet passing through a switch in a congestion state. Thus, the sequence of cells in a packet group (flow) directed to the same destination from the same transmission source is restored (flow restoration) to the original, and further, the packet must be restored (packet restoration) to the original.

US 2004/0143593 (A1) (patent document 1) discloses a method in which a sequence number (serial number) of a packet, a source number, a routing index (a value for referring to a single destination or a combination of plural destinations) and priority are used, a sufficient amount of packets of each flow are stored at a destination, and then, a packet sequence is restored to the original. However, in the packet sequence restoring method of US 2004/0143593 (A1), with respect to the flows the number of which is expressed by the product of the source number, the routing index and the priority, it is conceivable that a sufficient amount of packet holding mechanisms are required, and there is a problem that the amount of hardware can be large.

WO 02/43329 (A1) (patent document 2) discloses a method in which the same time stamp as well as a destination number, a source number, and a cell division number is added to cells generated from the same packet, a clock common to the respective parts of a switch fabric is used, a cell having an old time stamp is selected with priority in a switch, and at the destination of the switch, the cells belonging to the same flow and the packet are sequentially restored in the order in which the time stamp was added. However, in the cell and packet sequence restoring method of WO 02/43329 (A1), with respect to the flows the number of which is expressed by the product of the source number and the routing index, it is conceivable that a sufficient amount of packet holding mechanisms are required, and there is a problem that the amount of hardware can be large. Besides, also with respect to the point that the clock common to the respective parts of the switch fabric is used and the rearrangement is performed based on the time, there is a problem that it can become difficult as the transfer speed of the packet or the cell is raised.

U.S. Pat. No. 6,832,261 (B1) (patent document 3) discloses a method in which plural devices for restoring the sequence of cells and packets are used, and the sequence of the cells and packets is restored while communication is made with each other. From an example of U.S. Pat. No. 6,832,261 (B1), with respect to flows the number of which is expressed by the product of a transmission source slot (source number), a sequence number (serial number) and a destination slot (destination number), it is conceivable that a sufficient amount of packet holding mechanisms are required, and there is a problem that the amount of hardware can become large.

Besides, US 2004/0143593 (A1) and WO 02/43329 (A1) disclose that according to the load of each switch, a distribution operation is performed while taking a load balance in a distributing part as an input of a switch fabric. However, in general, when a simple load balance operation is performed, before a cell or a packet staying at a switch in a congestion state arrives at an objective destination, that is, an alignment part as an output of the switch fabric, a subsequent cell or packet can arrive via a switch in a non-congestion state. Thus, in the alignment part, in order to restore the sequence of the cells or packets, the alignment part must hold a large amount of cells or packets, and there is a problem that the amount of hardware can become large.

As described above, in the multi-plane cell switch fabric system of the related art in which the respective exchange parts asynchronously operate, although the methods of the flow restoration in the alignment part and the packet restoration are disclosed, all the methods have the problem that the amount of hardware can become large. Since the multi-plane cell switch fabric system has the original object of improving the exchange capacity of the whole switch, in order not to reduce the exchange capacity by the distribution operation and the restoration operation, a lot of hardware can be mounted. However, in order to reduce the cost of the apparatus, the multi-plane cell switch fabric system having the alignment part which can be realized by smaller-scale hardware is desired.

SUMMARY OF THE INVENTION

In view of the above, it is an object of the invention to provide a multi-plane cell switch fabric system in which, in an alignment part of the multi-plane cell switch fabric system in which respective exchange parts operate asynchronously, a method of restoring cells arriving in random sequence from the plural exchange parts into an original packet is realized by small capacity hardware.

Another object of the invention is to provide a multi-plane cell switch fabric system in which respective switches operate asynchronously, and an alignment part of each destination handles only one packet flow or two packet flows for each transmission source. Still another object of the invention is to provide a multi-plane cell switch fabric system with high exchange capacity at lower cost than the related art by reducing the amount of holding memory required at a time of alignment of cells and packets in a flow to an amount proportional to a number one or two times larger than the number of transmission sources.

According to an aspect of the invention, in a multi-plane cell switch fabric system including plural exchange parts each performing data exchange asynchronously, a distributing part as an input section of the switch fabric includes a mechanism that divides a variable length packet into one or more fixed length cells, a mechanism that manages serial numbers continuous for respective destinations, a mechanism that adds a head to a packet start cell, adds a tail to a packet end cell, and adds a destination bitmap indicating a number of the distributing part and a destination to all cells, and further adds the plural serial numbers corresponding to the destinations within a specified range, and a mechanism that outputs the cells to the one or more exchange parts, the plural exchange parts to deliver the cells to the objective destinations in the switch fabric include a mechanism that adjusts an output for each destination in cell units while a transmission sequence between cell groups of a same transmission source is kept, and an alignment part as an output of the switch fabric includes a mechanism that classifies received cells by the number of the distributing part and compares an expected value of the serial number with the serial number of the destination of the cell, aligned FIFO queues that are for the respective transmission sources and store the identical cells based on the comparison, and a mechanism that selects an aligned FIFO queue among the aligned FIFO queues in which the packet end cell arrives and takes out cells of from the packet start cell to the packet end cell.

According to another aspect of the invention, in a multi-plane cell switch fabric system including plural exchange parts each performing data exchange asynchronously, a distributing part as an input of the switch fabric includes a mechanism that divides a variable length packet into one or more fixed length cells, a mechanism that expresses two arbitrary destinations in two bits (when the bit is 1, the cell is transmitted), defines three kinds of 01, 10 and 11 as combinations of the two bits and as flows to the two destinations, and manages continuous serial numbers for each of the flows, a mechanism that adds a head to a packet start cell, adds a tail to a packet end cell, adds a destination bitmap indicating a number of the distributing part and a destination to all cells, and further adds the plural serial numbers corresponding to the destinations within a specified range, and a mechanism that outputs the cells to the one or more exchange part, each of the exchange parts to deliver the cell to an objective destination in the switch fabric includes a mechanism that adjusts an output for each destination in cell units while a transmission sequence among cell groups of the same transmission source is kept, and an alignment part as an output of the switch fabric includes a mechanism that classifies received cells by the number of the distributing part and a flow number indicated by two specified bits including the destination in the destination bitmap and compares an expected value of the serial number with a serial number of the destination of the cell, aligned FIFO queues that are for the respective transmission sources and the respective flow numbers and store the identical cells based on the comparison, and a mechanism that selects an aligned FIFO queue among the aligned FIFO queues in which the packet end cell arrives, and takes out cells of from the packet start cell to the packet end cell.

In the multi-plane cell switch fabric system, for example, in a multicast packet, when the number of destinations exceeds the number of serial numbers capable of being added to one cell, the distributing part divides the destination bitmap to make the number of serial numbers not larger than the number of the serial numbers capable of being added to one cell, makes copies of the cell, the number of which is the division number, and adds, to each of the cells after copying, the corresponding destination bitmap after division and the corresponding serial numbers of all destinations.

In the multi-plane cell switch fabric system, for example, in a multicast packet, when a pattern of a destination is a previously specified pattern, the pattern is made a special flow, a dedicated serial number is added by the distributing part, the alignment part manages the expected value of the serial number dedicated to the pattern separately from an expected value of a normal serial number, and performs identical comparison.

In the multi-plane cell switch fabric system, for example, when the packet divided into cells can not be transmitted from the distributing part in the middle of transmission due to congestion of the destination, a packet to another destination hot including the destination is divided into cells and transmission is started.

In the multi-plane cell switch fabric system, for example, in the alignment part, after a cell having an expected serial number and other than a packet end arrives from an arbitrary transmission source, when a subsequent cell having an expected serial number does not arrive from the same transmission source even when a specified period elapses, or when a cell other than an expected serial number arrives from the same transmission source and all exchange parts, it is regarded that the cell having expected serial number is discarded due to a failure before it arrives at the distributing part, the expected serial number is incremented by 1 and a process is performed, and the packet including the discarded cell is processed as an error packet.

In the multi-plane cell switch fabric system, for example, when each of the distributing parts includes plural inputs, and each of the alignment parts includes plural outputs, a destination bitmap indicating all outputs, in addition to a destination bitmap added to a cell, is held as data attached to the packet and in one of cells constituting the packet, a reference is made to a portion of the alignment part of the destination bitmap indicating all the outputs in an output portion of the alignment part, and a final output destination of the packet is determined.

According to another aspect of the invention, for example, in a multi-plane cell switch fabric system including plural exchange parts each performing data exchange asynchronously, a distributing part as an input of the switch fabric includes a mechanism that divides a variable length packet into one or more fixed length cells, a mechanism that manages serial numbers continuous for each of destinations, and a mechanism that adds a head to a packet start cell, adds a tail to a packet end cell, adds a destination bitmap indicating a number of the distributing part and a destination to all cells, and further adds the plural serial numbers corresponding to the destinations within a specified range, and in an alignment part as an objective output, cells are taken out via the respective exchange parts of the switch fabric in sequence from a cell with an expected serial number.

According to another aspect of the invention, for example, in a multi-plane cell switch fabric system including plural exchange parts each performing data exchange asynchronously, a distributing part as an input of the switch fabric includes a mechanism that divide a variable length packet into one or more fixed length cells, a mechanism that expresses two arbitrary destinations in two bits (when the bit is 1, the cell is transmitted), defines three kinds of 01, 10 and 11 as combinations of the two bits and as flows to the two destinations, and manages continuous serial numbers for each of the flows, a mechanism that adds a head to a packet start cell, adds a tail to a packet end cell, adds a destination bitmap indicating a number of the distributing part and a destination to all cells, and further adds the plural serial numbers corresponding to the destinations within a specified range, and a mechanism that outputs the cell to the one or more exchange parts, each of the exchange parts of the switch fabric includes a mechanism that adjusts output for each destination in cell units while a transmission sequence between cell groups of a same transmission source is kept, and in an alignment part as an objective output, cells are taken out via the respective exchange parts of the switch fabric in sequence from a cell with an expected serial number.

According to the first solving means of this invention, there is provided a multi-plane cell switch fabric system comprising:

a plurality of distributing parts as inputs of the multi-plane cell switch fabric system;

a plurality of alignment parts as outputs of the multi-plane cell switch fabric system; and a plurality of exchange parts to respectively and asynchronously perform data exchange from the distributing parts to the alignment parts, wherein the distributing part includes:

a mechanism that divides an inputted variable length packet into fixed length cells, adds a head to a packet start cell, adds a tail to a packet end cell, and adds, to all the cells, transmission source identifiers to indicate its own distributing parts and destination information indicating one or a plurality of alignment parts as destinations;

a mechanism of managing that manages, for each of the alignment parts as the destinations, serial numbers to indicate sequence of the cells for restoring the packet from the cells;

a mechanism of adding that refers to the managing mechanism based on destination information, and adds the one or the plurality of serial numbers corresponding to the destinations to the cells; and a mechanism that distributes and outputs the cells to the plurality of exchange parts, further wherein the alignment part includes:

a mechanism that classifies the received cells for the respective distributing parts of the transmission sources in accordance with the transmission source identifiers of the cells received through the plurality of exchange parts;

a mechanism of aligning that aligns, with respect to the cells classified for the respective distributing parts, the cells in accordance with the serial numbers added to the cells and corresponding to its own destination;

aligned queues that are for the respective distributing parts and store the aligned cells in sequence; and a mechanism that selects, among the aligned cues, the aligned queue storing the packet end cell to which the tail is added, takes out cells of from the packet start cell to which the head is added to the packet end cell to restore the packet, and outputs the packet.

According to the second solving means of this invention, there is provided a multi-plane cell switch fabric system comprising:

a plurality of distributing parts as inputs of the multi-plane cell switch fabric system;

a plurality of alignment parts as outputs of the multi-plane cell switch fabric system; and a plurality of exchange parts to respectively and asynchronously perform data exchange from the distributing parts to the alignment parts, wherein the distributing part includes:

a mechanism that divides an inputted variable length packet into fixed length cells, adds a head to a packet start cell, adds a tail to a packet end cell, and adds, to all the cells, transmission source identifiers to indicate its own distributing part and destination information indicating one or a plurality of alignment parts as destinations;

a mechanism of managing serial numbers that, with respect to a destination bitmap in which each bit corresponds to the alignment part, a cell is transmitted to the alignment part whose bit value 1, and the cell is not transmitted to the alignment part whose bit value is 0, combines two bits corresponding to previously determined two destinations, previously defines three kinds of combination patterns of 01, 10 and 11 among combination patterns of the two bits as flows to the two destinations, and manages serial numbers indicating sequence of cells corresponding to the three kinds of flows for each of the combinations of the two destinations, a mechanism that combines two bits corresponding to the previously determined two destinations of the destination bitmap, refers to the mechanism of managing serial numbers, to add the one or the plurality of serial numbers corresponding to the flows defined by the combination of the two destinations and the combination pattern of the two bits to the cell, and a mechanism that distributes and outputs the cells to the plurality of exchange parts, further wherein the alignment part includes:

a mechanism that classifies the received cells for the respective distributing parts of the transmission sources in accordance with the transmission source identifiers of the cells received through the plurality of exchange parts;

a mechanism of aligning that refers to the destination bitmap, determines, based on the previously determined combination of two bits including a bit corresponding to its own alignment part, whether a flow is a first flow of the combination pattern of 01 or 10 or a second flow of the combination pattern of 11, and aligns the cells in accordance with the serial numbers added to the cells for each of the first flow and the second flow, aligned queues that stores the aligned cells in sequence and is for the respective distributing parts and the respective flows, and a mechanism that selects the aligned queue storing the packet end cell among the aligned queues, takes out cells of from the packet start cell to the packet end cell, restores the packet, and outputs the packet.

According to the other solving means of this invention, in the multi-plane cell switch fabric system described above, wherein the mechanism of managing in the distributing part further manages, with respect to packets which destination information including plural destinations is previously specified pattern, serial numbers for the specified pattern indicating sequence of cells for restoring the packet, the mechanism of adding which adds the serial number to the cell in the distributing part refers to, when the destination information of the inputted packet is the previously specified pattern, the mechanism of managing and adds the serial number for the specified pattern to the cell, the alignment part separately manages the expected value of the serial number when the destination is the specified pattern and the expected value of the serial number when the destination is not the specified pattern, and aligns the cells in accordance with the serial number added to the cell separately according to whether the destination is the specified pattern or not.

According to the other solving means of this invention, in the multi-plane cell switch fabric system described above, wherein each of M (M is an integer of 2 or more) distributing parts includes j (j is an integer of 2 or more) input ports, each of N (N is an integer of 2 or more) alignment parts includes i (i is an integer of 2 or more) output ports, the distributing part inputs a packet including first destination bitmap of N×i bits indicating the alignment part as the destination and the output port, takes a logical sum of the first destination bitmap for every i bits corresponding to the alignment part to generate an N-bit second destination bitmap, adds the second destination bitmap to the divided cell and outputs it to the exchange part, the exchange part transmits the cell to the alignment part in accordance with the second destination bitmap, and the alignment part aligns the received cells to restore the packet, refers to the first destination bitmap of N×i bits included in the restored packet, determines one or a plurality of output destinations among the i output ports of its own alignment part, and outputs the restored packet.

According to the third solving means of this invention, there is provided a multi-plane cell switch fabric system including a plurality of exchange parts to respectively and asynchronously perform data exchange, wherein a distributing part as an input of the multi-plane cell switch fabric system includes:

a mechanism that divides a variable length packet into fixed length cells and adds a destination bitmap indicating an identifier of the distributing part and an alignment part of a destination to the cell;

a mechanism that manages serial numbers indicating sequence of the cells for each of destinations;

a mechanism that refers to the managing mechanism and adds a plurality of serial numbers corresponding to the destinations to the cells within a specified range; and a mechanism that outputs the cells to the exchange part, further wherein in the alignment part receiving the cells via the respective exchange parts of the multi-plane cell switch fabric system, among the plurality of serial numbers added to the cells, the serial number corresponding to its own alignment part is identified, and the cells are aligned in accordance with the serial number.

According to the fourth solving means of this invention, there is provided a multi-plane cell switch fabric system including a plurality of exchange parts to respectively and asynchronously perform data exchange, wherein a distributing part as an input of the switch fabric includes:

a mechanism that divides a variable length packet into fixed length cells and adds a destination bitmap indicating an identifier of the distributing part and an alignment part of a destination to the cell;

a mechanism that, with respect to the destination bitmap in which each bit corresponds to the alignment part and a cell is transmitted to the alignment part whose bit value 1, represents two arbitrary destinations in two bits, defines three kinds of 01, 10 and 11 as combinations of the two bits as flows to the two destinations, and manages serial numbers indicating sequence of cells for each of the flows;

a mechanism that adds a plurality of serial numbers corresponding to the destinations within a specified range; and a mechanism that outputs the cells to the exchange part, further wherein each of the exchange parts of the multi-plane cell switch fabric system includes a mechanism that adjusts an output for each of the destinations in cell units while transmission sequence between cell groups of the same transmission source is kept, and in the alignment part receiving the cells via the respective exchange parts of the multi-plane cell switch fabric system, the cells are aligned in accordance with the serial numbers.

According to the invention, the method in which, in the alignment part of the multi-plane cell switch fabric system in which the respective exchange parts operate asynchronously, cells arriving from the plural exchange parts in random sequence are restored into the original packet can be realized by small capacity hardware.

According to the invention, in the multi-plane cell switch fabric system in which the respective switches operate asynchronously, the alignment part of each of the destinations only handles one packet flow or two packet flows for each transmission source. Thus, the amount of holding memory required at the time of alignment of the cells and the packets in the flow can be reduced to the amount proportional to a number one or two times larger than the number of transmission sources, and the multi-plane cell switch fabric system with high exchange capacity can be constructed at lower cost than the method of the related art.

According to the invention, it is possible to provide a multi-plane cell switch fabric system in which, in an alignment part of the multi-plane cell switch fabric system in which respective exchange parts operate asynchronously, a method of restoring cells arriving in random sequence from the plural exchange parts into an original packet is realized by small capacity hardware.

According to the invention, it is possible to provide a multi-plane cell switch fabric system in which respective switches operate asynchronously, and an alignment part of each destination handles only one packet flow or two packet flows for each transmission source. Still another object of the invention is to provide a multi-plane cell switch fabric system with high exchange capacity at lower cost than the related art by reducing the amount of holding memory required at a time of alignment of cells and packets in a flow to an amount proportional to a number one or two times larger than the number of transmission sources.

BRIEF DESCRIPTION OF THE DRAWINGS

FIG. 9 is a schematic view showing a relation among a packet, a cell and a serial number in the embodiment.

FIG. 17 is a schematic view showing a relation among a packet, a cell and a serial number corresponding to FIG. 14 in the embodiment.

DETAILED DESCRIPTION OF THE INVENTION

Hereinafter, the more detailed contents will be described with reference to the drawings.

1. First Embodiment

Figure 1:
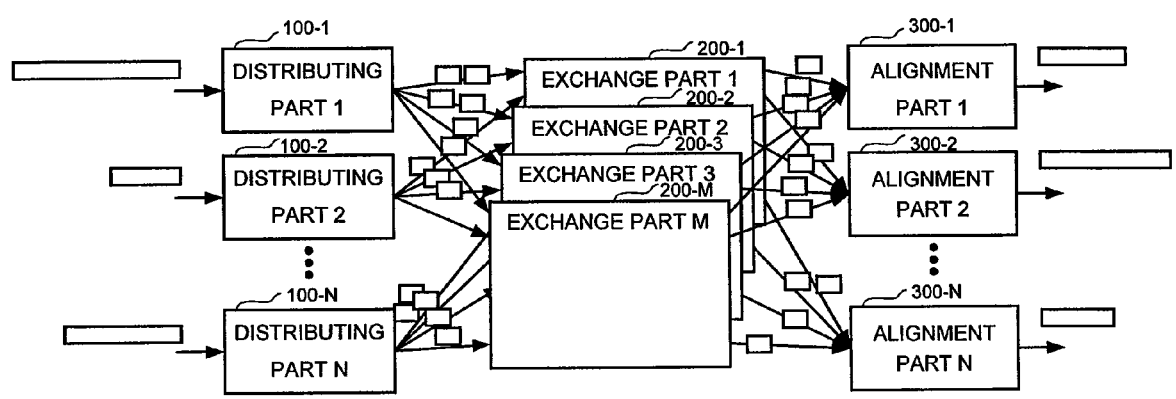
FIG. 1 is a block diagram showing an embodiment of a multi-plane cell switch fabric system.

FIG. 1 shows a structural example of a multi-plane cell switch fabric system of this embodiment.

The multi-plane cell switch fabric system includes, for example, N distributing parts 100 (100-1, 100-2, . . . , 100-N) as inputs of the switch fabric, M exchange parts 200 (200-1, 200-2, . . . , 200-M) to perform data exchange, and N alignment parts 300 (300-1, 300-2, . . . , 300-N) as outputs of the switch fabric (N and M are integers). The distributing part 100 divides a received variable length packet into fixed length cells, and transmits them to the plural exchange parts 200. The alignment part 300 as the destination repairs the received cells into the original sequence and outputs them as the packet. The exchange parts 200 operate independently of each other. That is, since the exchange parts perform destination adjustment of the input cells independently of each other, they behave as asynchronous distributed switches in the switch fabric.

Figure 2:
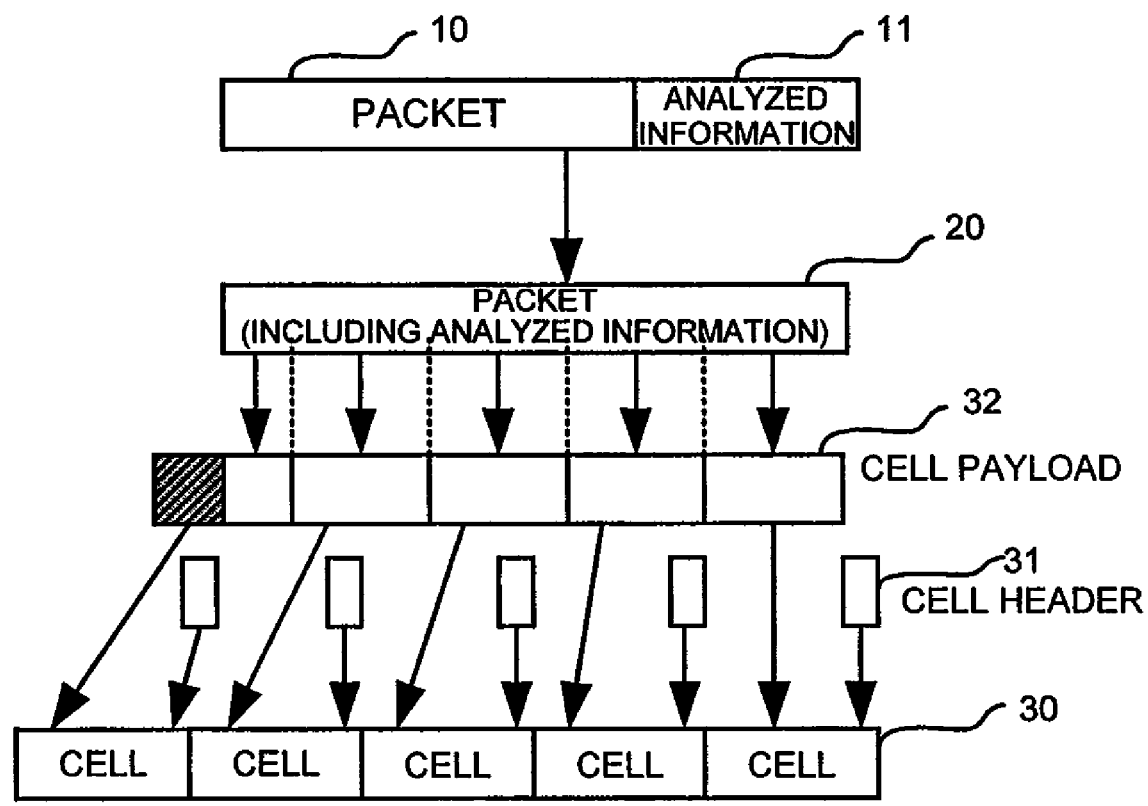
FIG. 2 is a schematic view showing a state where fixed length cells are generated from a variable length packet.

FIG. 2 shows a state where a variable length packet is divided into fixed length cells.

With respect to the division from the packet to the cells, the same method can be used in both the method of the related art and the method of the embodiment. In general, a packet transfer apparatus, such as a router, incorporating a switch fabric analyses the content of a received packet 10 and generates analyzed information 11 including a destination, a packet length, priority and the like. The generation of the analyzed information 11 may be performed in the distributing part 100, or may be performed using a network processor or a packet processing engine installed before input to the distributing part 100. In any event, in the distributing part 100, a packet 20 including the analyzed information 11 is divided by a specified fixed length into cell payloads 32. When a length is smaller than the fixed length, for example, a required number of values of zero are padded to the payload of the final cell to obtain the fixed length. Then, a cell header 31 is added to each of the cell payloads 32 to obtain fixed length cells 30.

The cell header 31 includes information required for restoring the packet 20 including the analyzed information 11 or the packer 10 in the original sequence after the cells 30 are made to pass from the distributing part 100 via some of the exchange parts 200 to the alignment part 300 of the destination.

Figure 5:
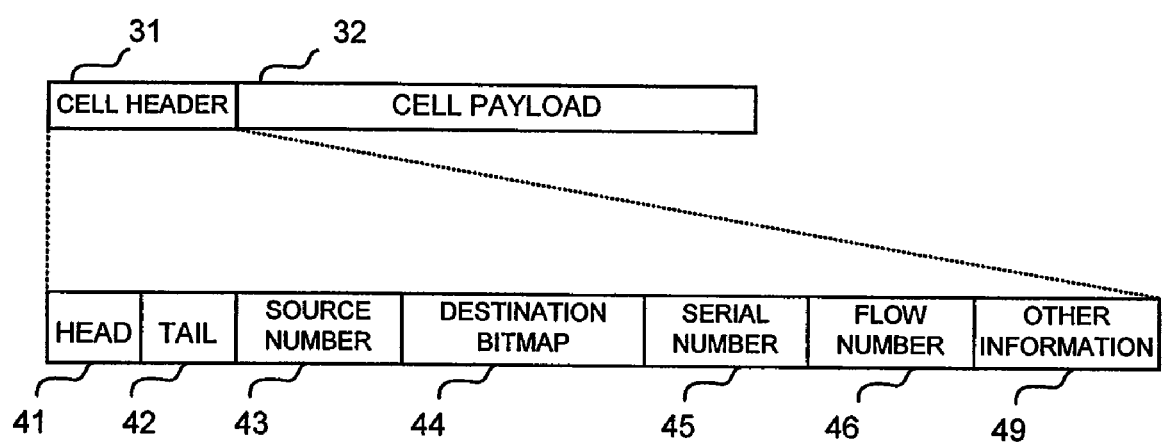
FIG. 5 is a view showing a cell header of the related art.

FIG. 5 shows a structural example of a cell header 31 of the related art.

In general, the cell header 31 includes a head 41 indicating the start cell of a packet, a tail 42 indicating the end cell of the packet, a source number 43 indicating the transmission source distributing part 100 of the packet, a destination bitmap 44 indicating a destination (alignment part) of the packet in the switch fabric, a flow number 46 indicating a pattern (combination) of plural destinations, and a serial number 45 indicating the sequence of the cell in the same flow. In some cases, the effective payload length of the cell or the like is also needed, and information other than the above is collectively denoted by other information 49. The destination bitmap 44 is indicated by, for example, 8-bit information when the number of destinations is eight, each bit is made to correspond to the destination, a bit (effective bit) whose value is 1 is the destination of the delivery object, and a bit (ineffective bit) whose value is 0 is not the delivery object. By the destination bitmap 44, not only a unicast to be transmitted to a single destination, but also a multicast to be transmitted to plural destinations can be represented.

The flow number 46 can be omitted when the total number of destinations is less than about 8. When the flow number 46 is omitted, the alignment part 300 of the destination can use the destination bitmap 44 itself as the flow number. However, when the total number of destinations exceeds 8, it is unrealistic that the alignment part 300 of the destination uses the destination bitmap 44 itself as the flow number. Because the alignment part 300 of the destination must identify the flows whose number is the total destination number power of 2, and the required memory amount becomes unrealistically large.

Figure 6:
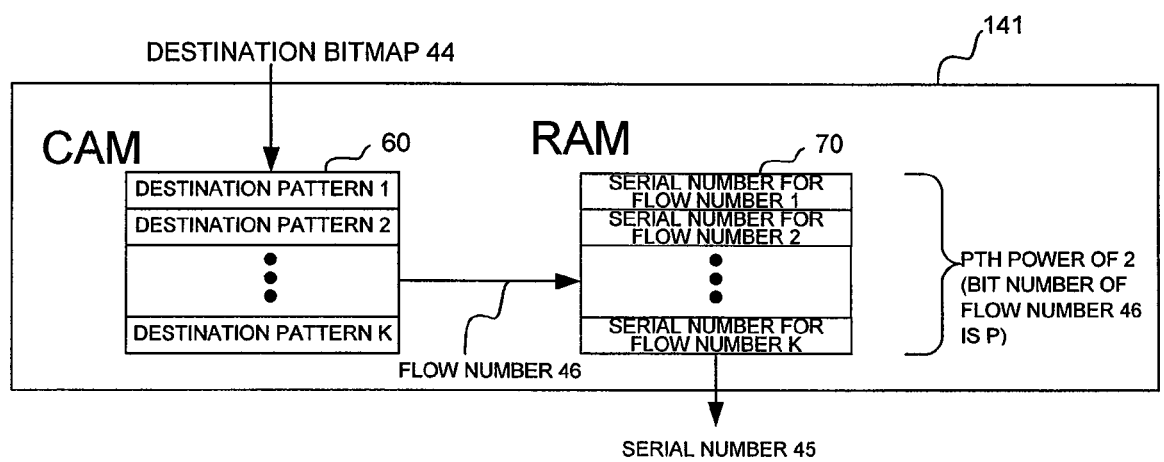
FIG. 6 is a schematic view showing a method of obtaining a serial number from a destination bitmap in the related art.

FIG. 6 is a schematic view showing a method of obtaining a serial number from a destination bitmap in the related art.

For example, US 2004/0141510 (A1) (patent document 4) discloses a method in which a CAM (Control Addressable Memory) is used, and a flow number whose bit number is sufficiently small is generated from a destination bitmap. As shown in FIG. 6, this is a method in which the destination bitmap 44 is inputted as a search key to a CAM 60, and an address of a CAM entry corresponding to the destination bitmap pattern is outputted as the flow number 46. The flow number 46 obtained in this method is made an address, an access is made to a RAM 70 containing serial numbers, and the serial number 45 corresponding to the flow number 46 can be obtained. Here, the serial number is managed for each flow number, and an area corresponding to an entry number of the CAM is used. When the number of bits of the flow number 46 is made P, the number of entries of the CAM 60 or the RAM 70 is the Pth power of 2. When the number of bits of the destination bitmap is made Q, the Pth power of 2 becomes a value smaller than the Qth power of 2. As stated above, in the case of the method in which the flow number is obtained in the reduced form of the destination bitmap, the number of flows capable of being expressed by the flow number becomes smaller than the amount of all combinations capable of being expressed by the destination bitmap. Thus, the flow number is exhausted, an operation of finding an unused flow number and adding it to a new flow is required. Besides, in this method, the alignment part 300 of the destination is also required to manage expected serial numbers whose number corresponds to the flow number, and a memory for that is required. Although the management itself of the expected serial number does not accompany large overhead, since it is necessary to restore the cell sequence and the packet while the cells of the plural flows are simultaneously managed, a large amount of memory for cell holding is required.

Figure 3:
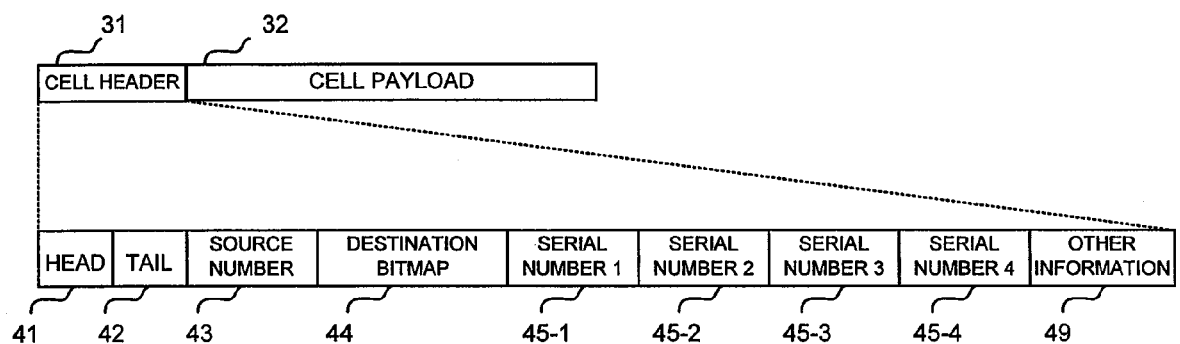
FIG. 3 is a view showing a structural example of a cell header in the embodiment.

FIG. 3 shows a structural example of the cell header of the embodiment.

Figure 4:
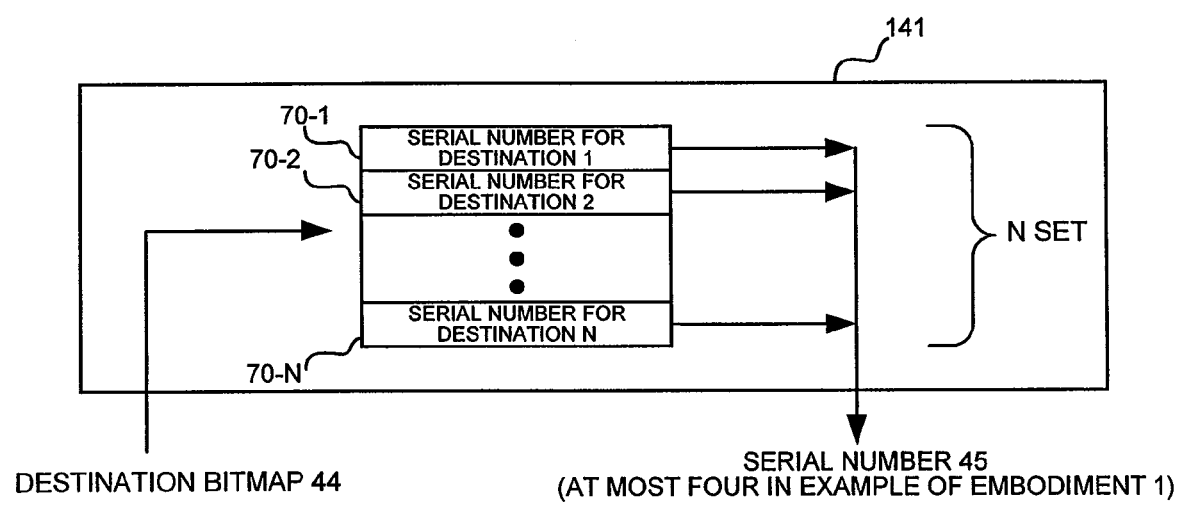
FIG. 4 is a schematic view showing a method of obtaining a serial number in the embodiment.

Next, a difference between the content of the cell header 31 in the embodiment and the cell header 31 of the related art will be described with reference to FIG. 3. In this embodiment, plural serial numbers are added to the cell header 31. The example of FIG. 3 shows that at most four serial numbers 45 are added to the cell header 31. In this case, as shown in FIG. 4, the serial number manager of the distributing part 100 manages the serial number for each destination (each alignment part). This means that irrespective of the combination of destination patterns, a packet flow for each destination is managed. Incidentally, FIG. 4 will be described later in detail. By this, the alignment part 300 as the destination handles only one flow for each transmission source, and the amount of hold memory required when the cells and packets in the flow are aligned can be reduced to an amount (amount corresponding to the number of transmission sources) proportional to the number of transmission sources. The memory amount corresponding to the number of flows as in the related art can be reduced. Thus, the multi-plane cell switch fabric system with high exchange capacity can be constructed at cost lower than the related art.

Figure 19:
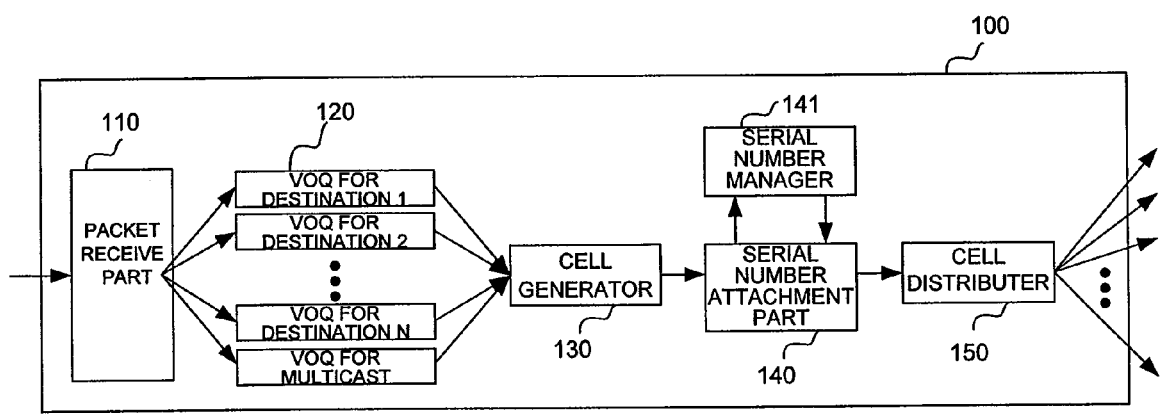
FIG. 19 is a block diagram of a distributing part in the embodiment.

Here, FIG. 19 is a block diagram of the distributing part 100.

The distributing part 100 includes, for example, a packet receive part 110, plural VOQ (Virtual Output Queue) group 120 for each destination and multicast (MC), a cell generator 130, a serial number attachment part 140, a serial number manager 141, and a cell partition part 150. Incidentally, FIG. 19 corresponds to one of the distributing parts 100 of FIG. 1. Accordingly, the multi-plane cell switch fabric system includes N structures of FIG. 19.

After receiving the packet 20 by the packet receive part 110, the distributing part 100 accumulates the packet in the corresponding VOQ among the VOQs 120 which are independent FIFO queues for the respective destinations. Incidentally, in the case of multicast, the packet is accumulated in the VOQ common to the multicast of all patterns. Next, the cell generator 130 confirms an empty state of each of the destinations of all the exchange parts 200 connected to the distributing part 100, selects one of the VOQs 120 corresponding to the empty destinations, takes out the packet 20, divides it into the cell payloads 32, and adds the cell header 31 to form the fixed length cells 30. In the cell header 31 at this time point, only the head 41, the tail 42, the source number 43, and the destination bitmap 44 are defined in the cell header 31. Besides, although not clearly appearing in the cell header 31, a number of the transmitting exchange part 200 is also defined at this point. Incidentally, when the empty destination disappears in the middle of taking out the packet 20, the formation of the cells of the packet 20 is once stopped, and when a next chance of formation of cells is obtained, the cell formation may be resumed from the continuation portion. Incidentally, with respect to the source number 43 and the serial number 45, a suitable identifier other than a number may be used. Besides, the destination bitmap may be suitable destination information including, for example, one or plural destination identifiers other than the bitmap.

Next, the serial number attachment part 140 receives the cell 30, sends the destination bitmap 44 of the cell header 31 to the serial number manager 141, determines the corresponding serial number 45, and writes it in the cell header 31. Finally, in the cell partition part 150, the cell 30 is transmitted to the specified exchange part 200.

FIG. 4 is a structural view of the serial number manager 141.

The serial number manager 141 manages the serial number for each destination. The destination bitmap 44 is inputted to the serial number manager 141 from the serial number attachment part. The first bit of the destination bitmap corresponds to the serial number for destination 1, the second to the Nth bits of the destination bitmap correspond to serial numbers for destinations 2 to N. One or plural serial numbers corresponding to effective bits (for example, the bit whose value is 1) of the inputted destination bitmap 44 are outputted.

Figure 7:
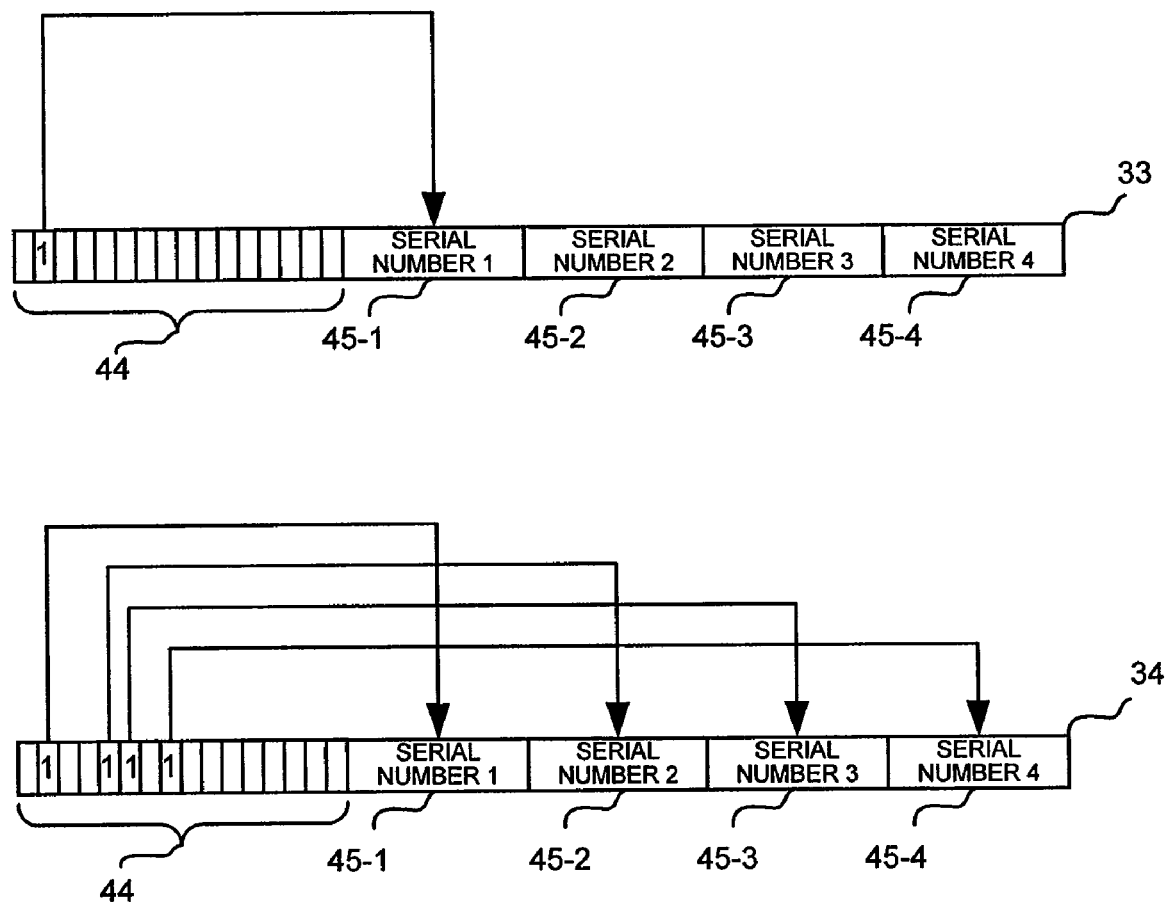
FIG. 7 is a schematic view showing a relation between a destination bitmap and a serial number in the embodiment.

FIG. 7 shows a relation between the destination bitmap 44 and the serial number 45 in this embodiment.

Reference numeral 33 in the upper part of FIG. 7 denotes a case of unicast, and the serial number of the corresponding destination is recorded at a position 45-1 of a serial number area 1. Fields of serial numbers 2, 3 and 4 are not used. Alternatively, for example, 0 may be entered. Reference numeral 34 in the lower part of FIG. 7 shows a case of multicast to four destinations, and with respect to the destination where 1 is recorded in the destination bitmap 44, the serial number of the leftmost (start side) destination is recorded at the position 45-1 of the serial number area 1 of the cell. Similarly, serial numbers of the second, third and fourth destinations from the left are recorded at positions 45-2, 45-3 and 45-4 of a serial number area 2, a serial number area 3 and a serial number area 4.

When the serial number is added to the cell, the corresponding serial number for destination in FIG. 4 is incremented by 1, and the serial number for a next cell is prepared. Incidentally, when the number of the managed serial numbers is made an amount exceeding the amount of all buffers on the halfway paths from the distributing part 100 to the objective alignment part 300 where the sequence of cells is aligned, in the alignment part 300, there does not occur a case where the same serial number simultaneously occurs and the alignment becomes impossible.

In this embodiment, when the number of destinations does not exceed the number (specified number) of serial numbers capable of being added to the cells, that is, in the example of the cell header of FIG. 3, when the number of destinations does not exceed four, cells transmitted from the distributing part 100 are copied by the exchange part 200 to all effective destinations indicated by the destination bitmap 44, and are transmitted to the corresponding alignment part 300.

Figure 8:
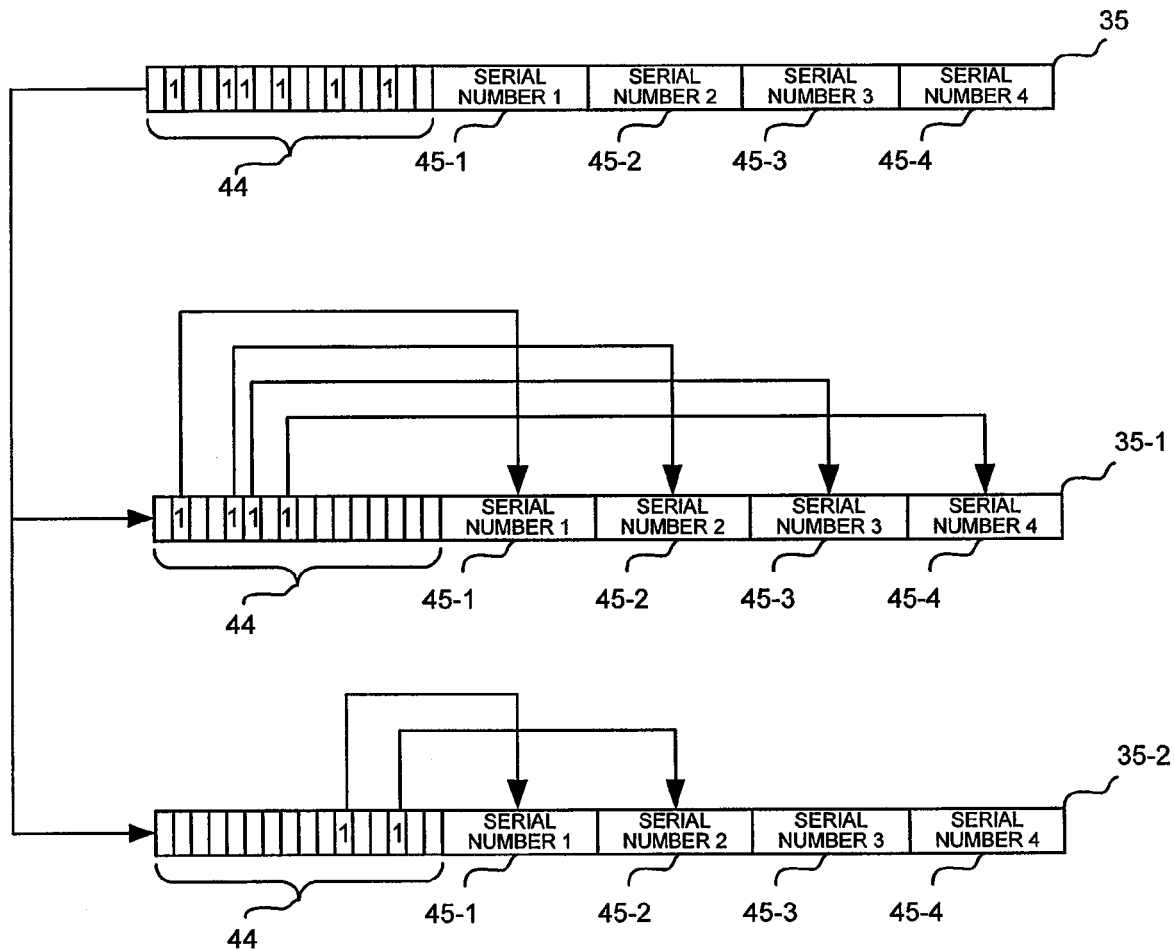
FIG. 8 is a schematic view showing a relation between the destination bitmap and the serial number in the embodiment.

FIG. 8 is an explanatory view of a case where the number of destinations exceeds the number of serial number areas.

When the number of destinations exceeds the number of serial numbers capable of being added to the cells, the packet and the cells generated from that are copied in the distributing part 100 and are transmitted. For example, in the example of the cell header of FIG. 3, when the number of destinations exceeds four, copying is performed in the distributing part 100. FIG. 8 shows an example of a case where the number of destination is 6. In this case, the destination bitmap 44 in which 6 bits are effective is divided into two parts, so that the number of effective bits does not exceed the number 4 of the serial numbers capable of being added to the cells. In the example of FIG. 8, the destination bitmap is divided into a first cell part 35-1 in which the number of effective destinations is 4 bits and a second cell part 35-2 in which it is 2 bits. Incidentally, the division may be performed at a suitable ratio such as 3 bits to 3 bits. The relation between the effective bits of the destination bitmap 44 after the division and the serial numbers 45-1, 45-2, 45-3 and 45-4 is as shown FIG. 8. In the first cell 35-1, the serial numbers of the destinations indicated by the effective bits of the divided destination bitmap are respectively recorded at the positions of the serial numbers 45-1, 45-2, 45-3 and 45-4. In the second cell 35-2, the serial numbers of the destinations indicated by the effective bits of the divided destination bitmap are respectively recorded at the positions of the serial numbers 45-1 and 45-2. Although not shown, based on the same way of thinking as the above explanation, when the number of effective bits of the destination bitmap 44 exceeds 8, a division into three has only to be performed, and when the number exceeds 12, a division into four has only to be performed.

FIG. 9 shows an example of a relation among a packet, a cell, and a serial number added to a cell header.

In this example, since a packet 1 includes three cells and is for destination 1, in the respective cell headers, 0, 1 and 2 are recorded as the serial numbers for destination 1 at positions of a serial number area 1. Since a packet 2 includes six cells and is multicast for destination 1 and destination 3, in the respective cell headers, the subsequent numbers 3 to 8 are recorded as serial numbers for destination 1 at positions of the serial number area 1, and 0 to 5 are recorded as serial numbers for destination 3 at positions of a serial number area 2.

Since a packet 3 includes three cells and is for destination 2, in the respective cell headers, 0, 1 and 2 are recorded as serial numbers for destination 2 at positions of the serial number area 1. Since a packet 4 includes five cells and is multicast for destination 2 and destination 3, in the respective cell headers, the subsequent numbers 3 to 7 are recorded as serial numbers for destination 2 at positions of the serial number area 1, and 6 to 10 are recorded as serial numbers for destination 3 at positions of the serial number area 2. Since a packet 5 includes three cells and is multicast for destination 1 to destination 6, the packet is copied, and the destination bitmap is divided into two parts. For example, the destination bitmap is divided into a bitmap in which destination 1 to destination 4 are effective (destination 5 6 are ineffective), and a bitmap in which destination 5 and destination 6 are effective (destinations 1 to 4 are ineffective). Then, with respect to the cells having the former destination bitmap, in the respective cell headers, 9 to 11 are recorded as serial numbers for destination 1 at positions of the serial number area 1 of the cell headers, 8 to 10 are recorded as serial numbers for destination 2 at positions of the serial number area 2, 11 to 13 are recorded as serial numbers for destination 3 at positions of the serial number area 3, and 0 to 2 are recorded as serial numbers for destination 4 at positions of a serial number area 4. Besides, with respect to the cells having the latter destination bitmap, in the respective cell headers, 0 to 2 are recorded as serial numbers for destination 5 at positions of the serial number area 1, and 0 to 2 are recorded as serial numbers for destination 6 at positions of the serial number area 2.

The distributing part 100 transmits a cell added with a required cell header to one of the plural exchange parts 200 to which transmission can be performed. The selection of the exchange part 200 to which the transmission is performed can be performed similarly to the related art. In accordance with the destination bitmap of the cell, the exchange part 200 transmits the cell to the alignment part 300 of the objective destination.

The cells arrive at the alignment part 300 of the destination from the plural exchange parts 200. When attention is paid to only an arbitrary one of the transmission sources, the sequence of the cells arriving from the same exchange part 200 is kept. However, since the sequence relating to an arbitrary transmission source via different exchange parts 200 is not ensured, it is necessary that the alignment part 300 restores the packet after suitably rearranging the cell sequence.

Figure 10:
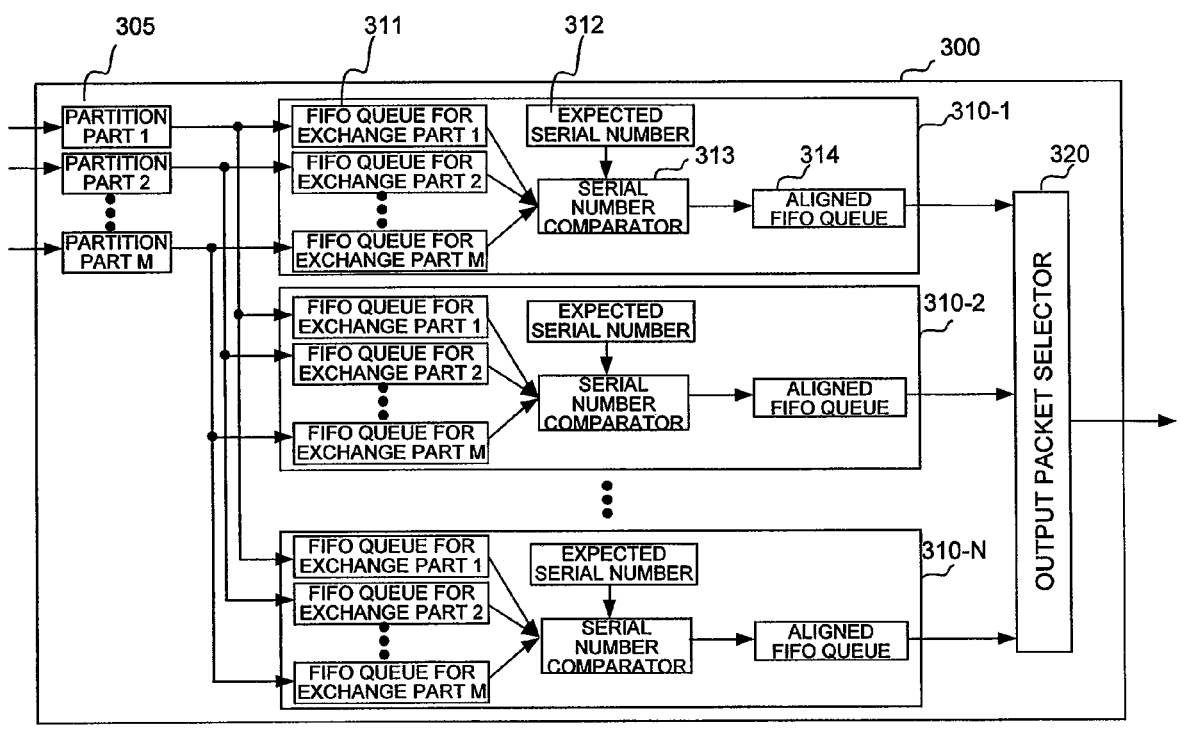
FIG. 10 is a block diagram of an alignment part in the embodiment.
Figure 11:
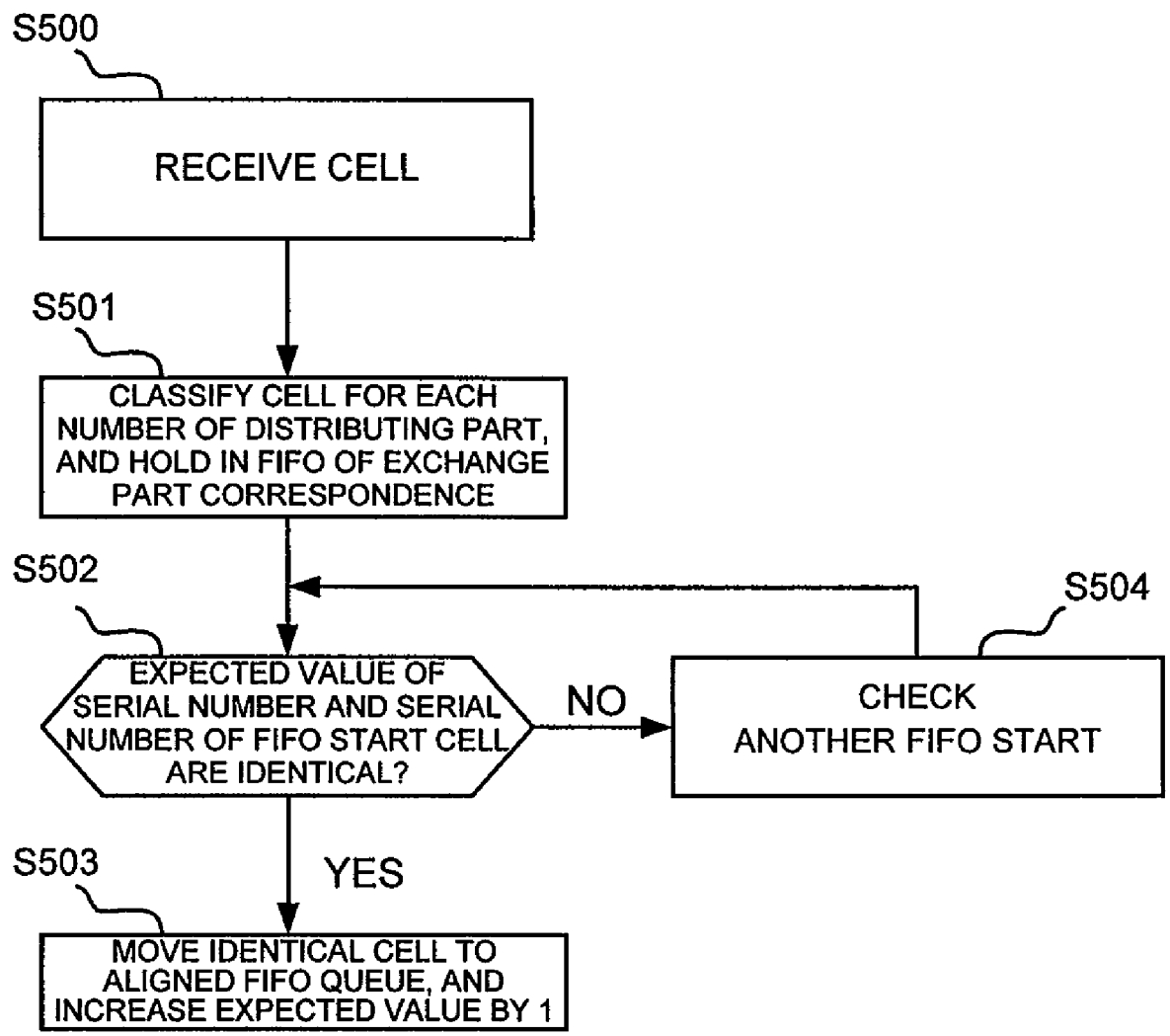
FIG. 11 is a flowchart showing a cell alignment method in the embodiment.
Figure 12:
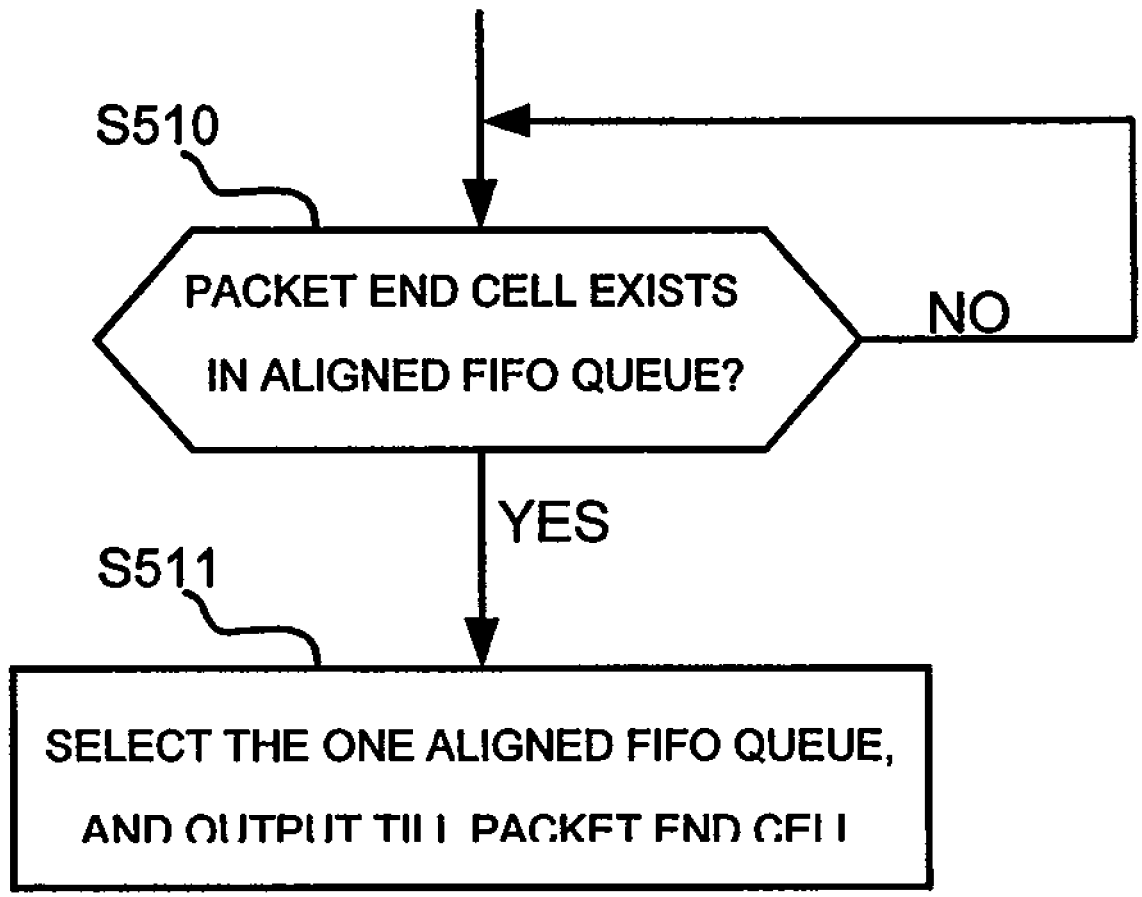
FIG. 12 is a flowchart showing a packet restoration method in the embodiment.

FIG. 10 shows a structural example of the alignment part 300 in this embodiment. FIG. 11 and FIG. 12 are flowcharts of alignment of cells and restoration of the packet. A method of suitably rearranging the cell sequence and restoring the packet will be described with reference to the flowcharts of FIG. 11 and FIG. 12.

The alignment part 300 includes, for example, partition parts 305 corresponding to the respective exchange parts 200, plural aligned blocks 310 corresponding to the distributing parts 100 of the respective transmission sources, and an output packet selector 320. When there are M exchange parts, there are M partition parts, and when there are N distributing parts 100, there are N aligned blocks 310. The aligned block 310 includes, at its input, FIFO (First In First Out) queues 311 corresponding to the exchange parts 200, an expected serial number manager 312, a serial number comparator 313, and an aligned FIFO queue 314. When there are M exchange parts 200, each of the aligned blocks includes the M FIFO queues 311 corresponding to the M exchange parts. Incidentally, the alignment part of FIG. 10 corresponds to one of the alignment parts of FIG. 1. Accordingly, the multi-plane cell switch fabric system includes N structures of FIG. 10.

When the alignment part 300 receives cells (S500 of FIG. 11), the partition parts 305 distribute the cells based on the source numbers 43 of the cell headers to the aligned blocks 310 corresponding to the distributing parts 100, and record them in the FIFO queues 311 corresponding to the exchange parts 200 via which they are transmitted (S501 of FIG. 11). The serial number comparator 313 selects one of the M exchange part correspondence FIFO queues 311 for each aligned block 310 from the correlation to the destination bitmap 44, selects the serial number of the serial number field corresponding to the alignment part 300 from the serial numbers of the serial number fields 45-1, 45-2, 45-3 and 45-4 of the start cell, and compares it with the expected serial number 312 (S502 of FIG. 11).

More specifically, the serial number comparator 313 refers to the effective bit (bit is 1) of the destination bitmap, and obtains the field corresponding to its own alignment part among the plural serial number areas 1 to 4. For example, as shown in the lower part of FIG. 7, the effective bit of the destination bitmap and the serial number area correspond to each other, and among the effective bits of the destination bitmap, when it is possible to know the order (relative positional relation), from the start, of the bit corresponding to its own alignment part, the serial number area (storage position) can be specified. With respect to the start cell of each of the FIFO queues, the serial number comparator 313 refers to the specified serial number area, and compares it with the expected serial number managed by the expected serial number manager 312. Incidentally, the expected serial number 312 stores, for example, 0 as the initial value, and each time the cell of the identical serial number is extracted from the FIFO queue 311, an increment of 1 is performed. Besides, when the managed expected serial number is the maximum value (or a value of a previously set serial number), the expected serial number is made zero or the initial value by the increment.

When the comparison result indicates inconsistency, the serial number comparator 313 checks the start cell of another FIFO queue for exchange part 311 (S504 of FIG. 11).

When the comparison result indicates consistency, the serial number comparator 313 moves the start cell of the identical FIFO queue for exchange part 311 to the aligned FIFO queue 314, and for next comparison, the expected value serial number 312 is incremented by one (S503 of FIG. 11). By this operation, the sequence of the cells from the arbitrary transmission source can be suitably rearranged. The above process is executed by each of the aligned blocks 310.

Thereafter, the output packet selector 320 selects one of the aligned FIFO queues 314 in which there is a cell having the tail 42 indicating the end cell of the packet (S510 of FIG. 12), and takes out the cells of from the cell having the head 41 to the cell having the tail 42 from the selected FIFO queue 314 (S511 of FIG. 12). The output packet selector 320 deletes the cell header and collects only the cell payloads, and restores the packet (packet including the analyzed information) and outputs it. The accurate end position of the packet to be restored can be specified by referring to the analyzed information 11 in the packet (the packet 20 including the analyzed information).

Incidentally, there is a possibility that before the cell arrives at the alignment part 300, some sort of failure occurs and an arbitrary cell disappears. A method of continuing an aligning process of cells and packets even when such a failure occurs will be described with reference to FIG. 10.

First, in this embodiment, in the serial number comparator 313 of the aligned block 310 of the alignment part 300, it is checked whether the start cell of the FIFO queue 311 corresponding to each exchange part is the cell with the expected serial number. When the cell having the expected serial number disappears due to the failure, the check of the expected serial number (S502, S504) becomes unsuccessful. Then, in the aligned block 310, an arbitrary time is set for detection of a failure. After an arbitrary cell not having the tail 42 succeeds in the check, when a next cell (cell having the subsequent serial number) does not arrive even when the arbitrary set time elapses, it is regarded that the cell having the expected serial number was discarded due to the failure. Then, information that the cell of the present expected serial number 312 is the error cell is accumulated in the aligned FIFO queue 314. Besides, the expected serial number 312 is incremented by 1 and the check of the subsequent cell is continued.

Besides, when all the FIFO queues for exchange part 311 of a certain aligned block 310 have cells, and the start cell of those has a value different from the expected serial number 312, it is understood that the cell having the present expected serial number 312 disappears due to the failure. Thus, also in this case, the information indicating that the cell of the present expected serial number 312 is the error cell is accumulated in the aligned FIFO queue 314. Besides, the expected serial number 312 is incremented by 1 and the check of the subsequent cell is continued.

The aligned FIFO queue 314 receiving the error cell is in the state where the packet including the error can be outputted. Then, the cells of from the start cell to the error cell, together with the information indicating the error packet, are outputted. Incidentally, the aligned FIFO queue 314 receiving the error cell discards all received cells unless the cell includes the head 41, so that the packet in the erroneous state is not outputted in the output of the alignment part 300.

Until now, the cell multi-plane cell switch fabric system of the embodiment has been described in detail. The above description merely relates to an embodiment, and various modifications can be made without departing from the technical concept and the technical scope of the invention.

2. Second Embodiment

In a second embodiment, the distributing part 100 of the multi-plane cell switch fabric system in FIG. 1 manages the serial number with respect to a specified destination pattern in addition to a specific destination.

Figure 13:
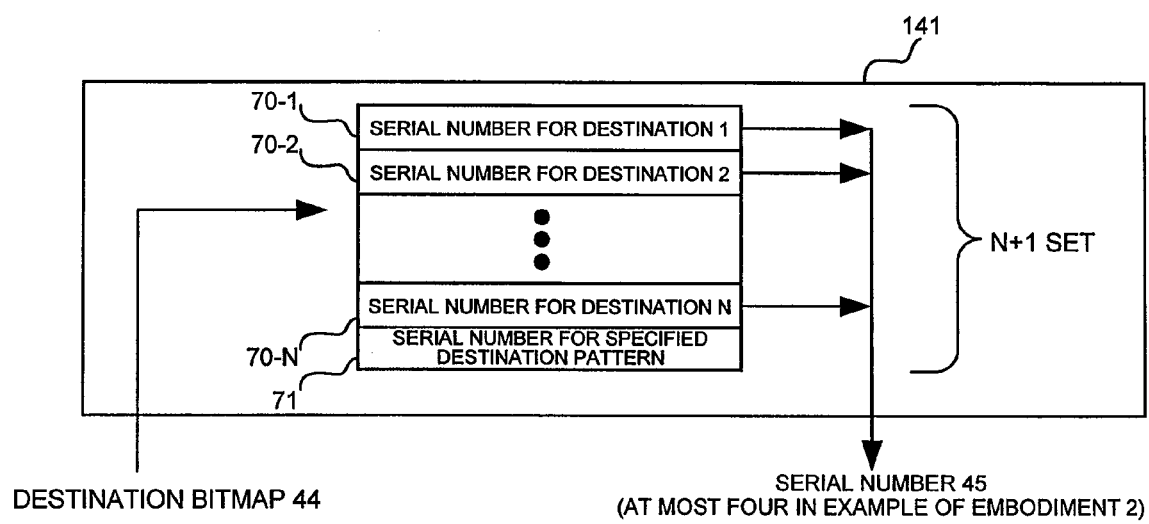
FIG. 13 is a schematic view showing a method of obtaining a serial number in the embodiment.

FIG. 13 is a structural view of a serial number manager 141 in the second embodiment.

In the second embodiment, as shown in FIG. 13, the serial number manager 141 of each of N distributing parts 100 manages a serial number 71 for a specified destination pattern in addition to serial numbers 70-1 to 70-N for specific destinations. For example, when broadcast to perform transmission to all destinations is set as the specified destination pattern, with respect to the cell for transmitting the packet for broadcast, the serial number 71 for specified destination pattern is added to the position 45-1 of the serial number 1 in the cell header 31 of FIG. 3.

Figure 14:
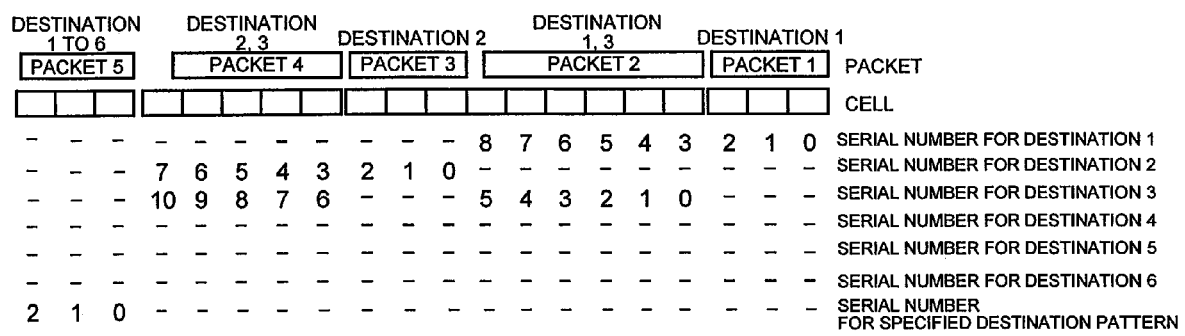
FIG. 14 is a schematic view showing a relation among a packet, a cell and a serial number corresponding to FIG. 12 in the embodiment.

FIG. 14 shows an example of a relation among a packet, a cell in the second embodiment, and a serial number to be added to a cell header.

In packet 1 to packet 4, the serial numbers are added to the cell headers in the same rule as the first embodiment. When packet 5 including three cells is the foregoing broadcast, as the serial numbers for the specified destination pattern, 0, 1 and 2 are added to the position 45-1 of the serial number 1 of each of the three cell headers.

Figure 20:
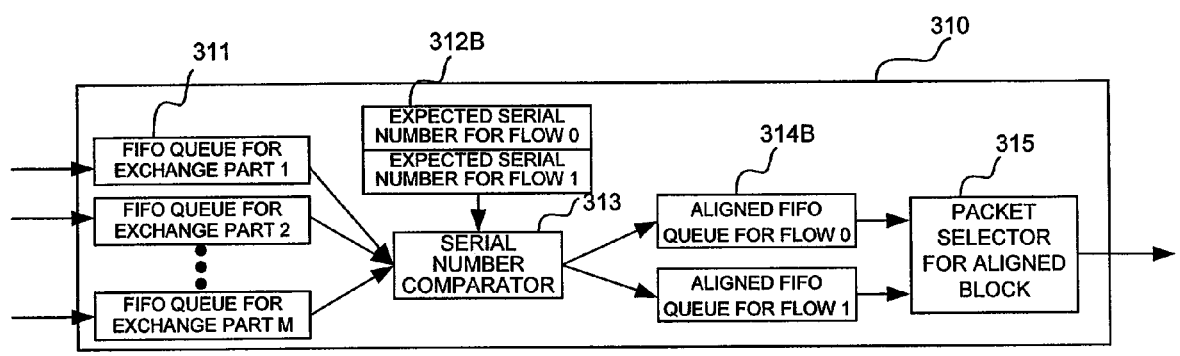
FIG. 20 is a block diagram of an alignment part for 2 flows per distributing part in the embodiment.

FIG. 20 is a structural view of an aligned block 310 in the second embodiment.

As shown in FIG. 20, an alignment part 300 of a destination includes, in the aligned block 310, an expected serial number manager 312B to manage two kinds of expected serial numbers, two kinds of aligned FIFO queues 314B, and a packet selection part 315 in an aligned block. That is, with respect to a specific transmission source, two flows are managed. In this example, one flow is a broadcast flow (flow 0 or first flow), and another flow is a flow (flow 1 or second flow) including the destination other than the broadcast. Similarly to the first embodiment, the alignment part 300 distributes cells to the suitable aligned blocks 310, refers to the destination bitmap 44 in the cell header, and determines that the flow is which of the two flows. The alignment part 300 performs an identical check of the expected serial number 312B for the determined flow and the serial number of the received cell, and stores the identical cell in the aligned FIFO queue 314B of the corresponding flow. Then, one of the aligned FIFO queues 314B in which the cells to the packet end are gathered is selected by the packet selection part 315 in the aligned block, and is made a selection candidate of the packet selection part 320 shown in FIG. 10. A subsequent packet restoration process and a process at the time of failure occurrence may be performed in the same way as the first embodiment. Incidentally, the other structure of the distributing part 100, the structure of the exchange part 200, and the other structure of the alignment part 300 are similar to the first embodiment.

In this embodiment, the alignment part 300 as the destination has only to handle the two flows for the transmission source. That is, the amount of hold memory required at the time of alignment of cells and packets in the flow can be reduced to the amount (amount corresponding to the double of the number of transmission sources) proportional to the double of the number of transmission sources, and the multi-plane cell switch fabric system with high exchange capacity can be constructed at lower cost than the related art.

Incidentally, the specified destination pattern can be made multicast to the destinations whose number exceeds the number of serial numbers capable of being added to the cell header. In the case of the specified destination pattern, in the first embodiment, it is necessary that the cell is copied in two or more by the distributing part 100. However, in the second embodiment, there is a merit that copying can be made unnecessary.

Until now, the cell multi-plane cell switch fabric system of the embodiment has been described in detail. The above description merely relates to an embodiment, and various modifications can be made without departing from the technical concept and the technical scope of the invention.

3. Third Embodiment

In a third embodiment of the invention, the distributing part 100 of the multi-plane cell switch fabric system in FIG. 1 represents two arbitrary destinations by two bits (when the bit is 1, the cell is transmitted), defines, as combinations of the two bits, three kinds of 01, 10 and 11 as flows to the two destinations, and manages continuous serial numbers for each of the flows.

Figure 15:
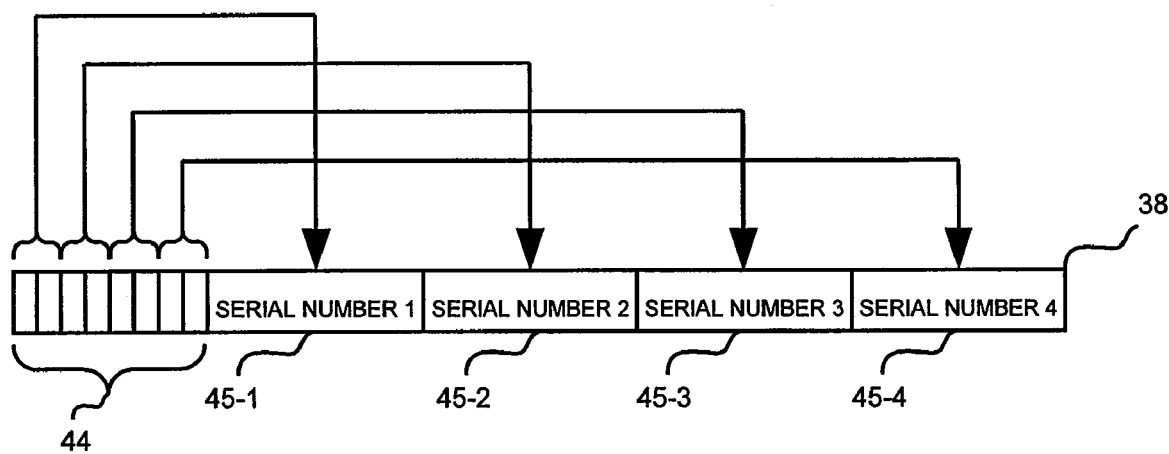
FIG. 15 is a schematic view showing a relation between a destination bitmap and a serial number in the embodiment.

FIG. 15 shows an example of a relation between a destination bitmap 44 of a cell header and a serial number 45 in the case of the third embodiment.

When the number of destinations is at most N, fields 45 for serial number, the number of which is obtained by dividing N by 2, are prepared. In this example, since the number of destinations is at most 8, four fields 45-1, 45-2, 45-3 and 45-4 for serial number, the number of which is obtained by dividing 8 by 2, are prepared. In the destination bitmap 44, although any two destinations may be paired, in the example of FIG. 15, for facilitating the understanding, two adjacent destinations are paired. Incidentally, when the value obtained by dividing N of the maximum number of destinations by 2 is excessively large, as in the first embodiment, the destination bitmap 44 is suitably divided to reduce the number of the fields 45 for serial number, and the cell may be copied in the distributing part 100.

When a cell is transmitted to a certain destination, a position (bit) of the destination bitmap 44 indicating the destination becomes 1 (effective). That is, the combinations of two bits indicating effective destinations are limited to three kinds (3 flows) of 01, 10 and 11. In the combination of bits of 00, a cell is not transmitted, the serial number may not be managed. Then, the distributing part 100 can manage the serial number only for the effective combination. When the total number of destinations is 8, access to the serial number manager 141 is simultaneously made by a combination of a destination bitmap portion indicating destination 1 and destination 2, a combination of a destination bitmap portion indicating destination 3 and destination 4, a combination of a destination bitmap portion indicating destination 5 and destination 6, and a combination of a destination bitmap portion indicating destination 7 and destination 8.

Figure 16:
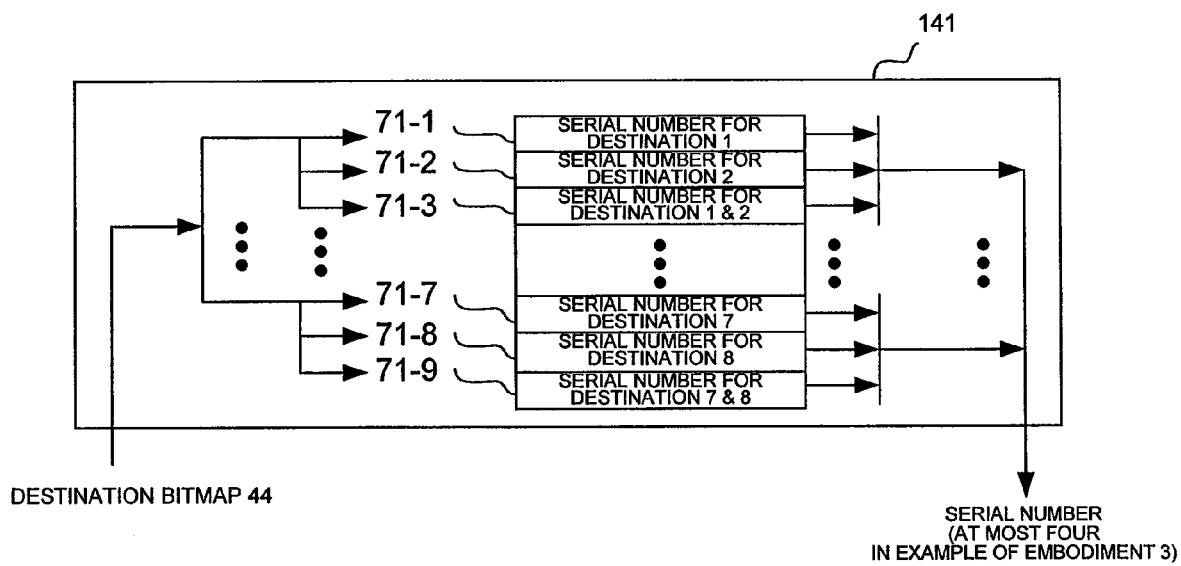
FIG. 16 is a schematic view showing a method of obtaining a serial number corresponding to FIG. 14 in the embodiment.

FIG. 16 shows a structural example of a serial number manager 141 in the third embodiment.

Since the effective combinations of two destinations have three kinds as stated above, with respect to the destinations 1 and 2, the serial number manager 141 manages such that a serial number 71-1 for destination 1 corresponds to the combination of bits of 10, a serial number 71-2 for destination 2 corresponds to the combination of bits of 01, and a serial number 71-3 for destination 1 and destination 2 corresponds to the combination of bits of 11. The serial number corresponding to the effective combination of the specified destination is added to the specified serial number position of the cell. Incidentally, the combination of other destinations is the same.

For example, the serial number manager 141 divides the inputted destination bitmap into two bits, and with respect to the destinations 1 and 2 (2 bits of the start), when the combination of bits is 10, the corresponding serial number 71-1 for destination 1 is read, when the combination of bits is 01, the corresponding serial number 71-2 for destination 2 is read, and when the combination of bits is 11, the corresponding serial number 71-3 for destinations 1 and 2 is read. Besides, also with respect to the other two destinations, the serial number is similarly read. The serial number manager 141 outputs the plural read serial numbers to the serial number attachment part 140. Here, when the number of destinations of the destination bitmap is N, the number of outputted serial numbers is N/2.

FIG. 17 shows an example of a relation among a packet, a cell and a serial number to be added to a cell header in the third embodiment.

With respect to cells generated from packet 1 for destination 1, serial numbers for destination 1 are added to position 45-1 of serial number 1 of the cell header. With respect to cells generated from packet 2 for destination 1 and destination 3, serial numbers for destination 1 are added to the position 45-1 of serial number 1, and serial numbers for destination 3 are added to position 45-2 of serial number 2 of the cell header. With respect to cells generated from packet 3 for destination 2, serial numbers for destination 2 are added to the position 45-1 of serial number 1 of the cell header.

With respect to cells generated from packet 4 for destination 2 and destination 3, serial numbers for destination 2 are added to the position 45-1 of serial number 1, and serial numbers for destination 3 are added to the position 45-2 of serial number 2 of the cell header. With respect to cells generated from packet 5 for destination 1 to destination 6, serial numbers for destination 1 and destination 2 are added to the position 45-1 of serial number 1 of the cell header, serial numbers for destination 3 and destination 4 are added to the position 45-2 of serial number 2 of the cell header, and serial numbers for destination 5 and destination 6 are added to position 45-3 of serial number 3 of the cell header.

The alignment part 300 as the destination manages two kinds of expected serial numbers 312 and two kinds of aligned FIFO queues 314 in the aligned block 310. That is, with respect to a specific transmission source, two flows are managed. In this example, one flow is a flow in which one destination paired with its own destination is effective, and another flow is a flow in which one destination paired with its own destination is ineffective. In other words, for example, when the left (or right) bit in 2-bit representation is made its own destination, the former is the flow of 11, and the latter is the flow of 10 (or 01). Similarly to the first embodiment, the alignment part 300 distributes cells to suitable aligned blocks 310, refers to the destination bitmap 44 in the cell header, and determines whether the flow is which of the two flows. For example, a bit corresponding to its own destination is previously determined, and it is previously determined that a bit of a combination in two-bit representation is before or after its own bit. For example, separation is made by every two bits from the start, and two bits including its own bit can be discriminated. An identical check to the expected serial number 312 for the flow is performed, and the identical cell is stored in the corresponding aligned FIFO queue 314. With respect to a subsequent packet restoration process or a process at the time of failure occurrence has only to be performed similarly to the first embodiment. The other structure of the distributing part 100, the structure of the exchange part 200, and the other structure of the alignment part 300 are similar to the second embodiment.

In this embodiment, similarly to the second embodiment, the alignment part 300 as the destination has only to handle two flows for a transmission source. That is, the amount of hold memory required at the time of alignment of the cells and packets in the flow can be reduced to the amount (amount corresponding to the double of the number of transmission sources) proportional to the double of the number of transmission sources, and the multi-plane cell switch fabric system with high exchange capacity can be constructed at lower cost than the related art.

Besides, in the third embodiment, differently from the first embodiment and the second embodiment, even when the number of destinations of multicast exceeds the number of the serial number fields 45 of the cell header of FIG. 3, there is a case where the cell copy in the distributing part 100 can be eliminated. For example, when the total number of destinations is 16, when 8 (obtained by dividing the total number of destinations by 2) serial number fields 45 of FIG. 3 are provided, for any multicast, copying of cells does not occur in the distributing part 100. Even under the same condition, in the first embodiment, when the total number of destinations exceeds 8, it is necessary to make two copies of the cell by the distributing part 100. In the second embodiment, in the case of the specified destination pattern, copying is unnecessary, however, in the other case, when the total number of destinations exceeds 8, it is necessary to make two copies of the cell by the distributing part 100.

Until now, the cell multi-plane cell switch fabric system of the embodiment has been described. The above description merely relates to an embodiment and various modifications can be made within the technical concept and the technical scope of the invention.

4. Fourth Embodiment

In a fourth embodiment, the distributing part 100 and the alignment part 300 of the multi-plane cell switch fabric system in FIG. 1 contain plural lines.

Figure 18:
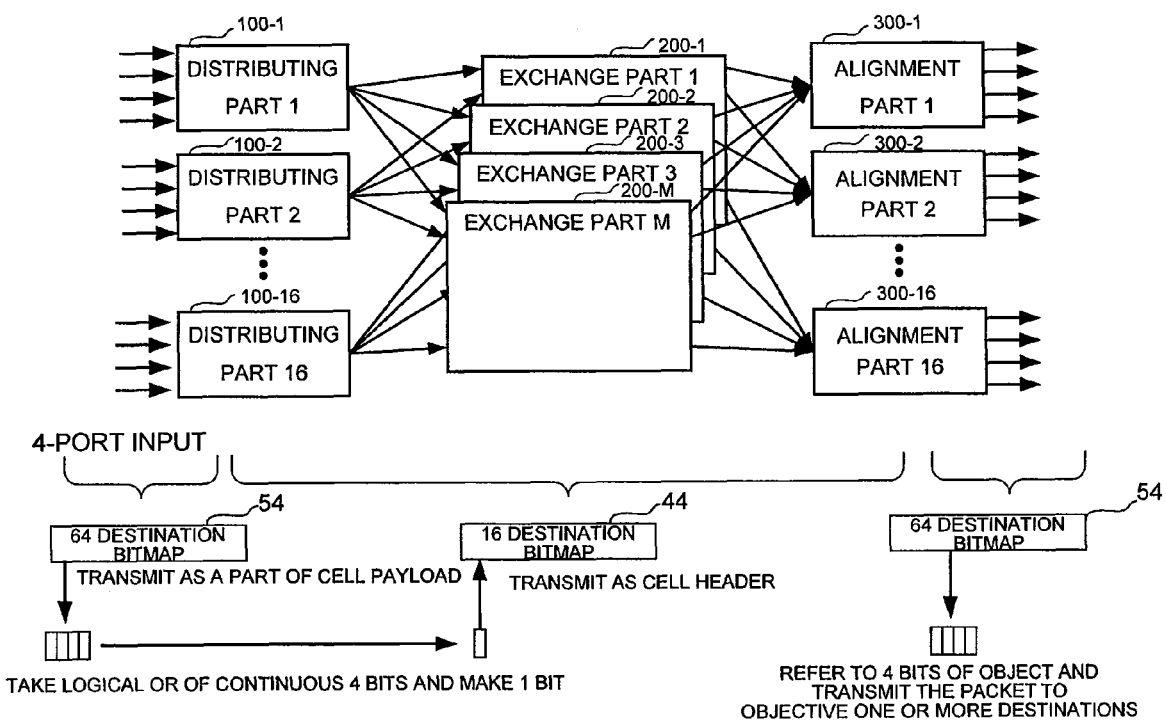
FIG. 18 is a block diagram showing an embodiment of a multi-plane cell switch fabric system when the number of input/output ports is increased.

FIG. 18 is a structural view of a switch fabric of this embodiment.

For example, there are 16 (N) distributing parts 100 and 16 (N) alignment parts 300, and when each of them contains four lines (i lines), a switch fabric as shown in FIG. 18 is obtained. Here, N and i are integers of 2 or more. Incidentally, the number of distributing parts may not be equal to the number of alignment parts, and for example, M distributing parts 100 may exist, and each of them may contain j lines (j input ports). Here, M and j are integers of two or more.

In this case, in the distributing part 100 shown in FIG. 19, the packet receive part 110 has four line inputs, not one line input. Besides, in the alignment part 300 shown in FIG. 10, the output packet selector 320 has four line outputs, not one line output.

When viewed from an arbitrary distributing part 100, as the switch fabric, the total number of output ports becomes 16×4=64. In this case, the analyzed information 11 of the packet 20 of FIG. 2 holds a destination bitmap 54 of 64 bits (N×i bits). In the destination bitmap 54 of 64 bits, the alignment part 300 as a specific destination can be selected by four continuous bits. For example, when the destination bitmap is determined to correspond to ports 1 to 4 of the alignment part 1 and ports 1 to 4 of the alignment part 2 from the start, the start 4 bits correspond to the alignment part 1, and the next four bits correspond to the alignment part 2.

Then, the distributing part 100 converts a value of the logical OR of the four continuous bits in the destination bitmap (first destination bitmap) 54 of 64 bits into 1 bit, generates the 16-bit destination bitmap 44 for cell header, adds the 16-bits destination bitmap (second destination bitmap) 44 as the cell header, and uses it for switching in the exchange part 200.

For example, the packet receive part 110 separates the 64-bit destination bitmap of the inputted packet by every 4 bits, takes the logical OR of the separated 4 bits to convert them into 1 bit, and generates a destination bitmap of 16 bits in which the converted 1 bit is arranged. Similarly to the first embodiment, in accordance with the generated 16-bit destination bitmap, the packet receive part 110 stores the packet in the VOQ 120 corresponding to the destination (here, corresponding to the alignment part and multicast). At this time, the generated 16-bit destination bitmap may be added to the packet.

Incidentally, the packet receive part 110 includes the VOQ for each destination (here, corresponding to each port of the alignment part and multicast), and may store the packet in the VOQ 120 in accordance with the 64-bit destination bitmap. In this case, the generation of the 16-bit destination bitmap may be performed in the cell generator 130.

The cell generator 130 uses the cell header including the generated 16-bit destination bitmap, and generates the cells from the packet. In accordance with the 16-bit destination bitmap, the serial number attachment part 140 adds the serial number similarly to the first embodiment, and the cell partition part 150 distributes the cells to the exchange parts 200.

The alignment part 300 of the objective destination aligns the arrival cell group similarly to the first embodiment, and restores the packet 20. After the restoration, for example, the output packet selector 320 refers to the 4-bit information indicating the alignment part 300 in the 64-bit destination bitmap 54 included as the analyzed information 11 in the restored packet 20, and transmits the packets to the objective one or plural destination ports among the four output ports.

Until now, the cell multi-plane cell switch fabric system of the embodiment has been described in detail. The description merely relates to an embodiment, and various modification can be made without departing from the technical concept and the technical scope of the invention. Incidentally, this embodiment can be combined with not only the first embodiment, but also the second or the third embodiment.

The cell multi-plane cell switch fabric system of the invention can be used for, for example, a system using a large capacity line and requiring data exchange. For example, it is conceivable that the invention is used for a switch fabric in a network apparatus typified by a router or a switch, or for a switch fabric in an apparatus such as a server or a storage apparatus.

What is claimed is:

1. A multi-plane cell switch fabric system comprising:
   a plurality of distributing parts as inputs of the multi-plane cell switch fabric system;
   a plurality of alignment parts as outputs of the multi-plane cell switch fabric system; and
   a plurality of exchange parts to respectively and asynchronously perform data exchange from the distributing parts to the alignment parts,
   wherein each distributing part includes:
   a mechanism that divides an inputted variable length packet into fixed length cells, adds a head to a packet start cell, adds a tail to a packet end cell, and adds, to all the cells, transmission source identifiers to indicate its own distributing part and destination information indicating one or a plurality of alignment parts as destinations in the form of a destination bitmap, the bits of the destination bitmap corresponding respectively to the alignment parts, and each bit indicating that a cell is transmitted to the alignment part corresponding to the bit if the bit value is 1 and the cell is not transmitted to the alignment part corresponding to the bit if the bit value is 0;
   a mechanism of managing serial numbers that manages serial numbers indicating a sequence of cells for each of three kinds of flows for each of a plurality of combinations of two destinations, the three kinds of flows being defined for each of the combinations of the two destinations by three kinds of combination patterns of 01, 10 and 11 among combination patterns of the two bits of the destination bitmap;
   a mechanism that combines two bits by two bits of the destination bitmap, refers to the mechanism of managing serial numbers to add the one or the plurality of serial numbers corresponding to the flows defined by the combination of the two destinations and the combination pattern of the two bits to the cell; and
   a mechanism that distributes and outputs the cells to the plurality of exchange parts,
   further wherein the alignment part includes:
   a mechanism that classifies the received cells for the respective distributing parts of the transmission sources in accordance with the transmission source identifiers of the cells received through the plurality of exchange parts;
   a mechanism of aligning that refers to the destination bitmap, determines, based on the combination pattern of two bits including a bit corresponding to its own alignment part, whether a flow is a first flow of the combination pattern of 01 or 10 or a second flow of the combination pattern of 11, and aligns the cells in accordance with the serial numbers added to the cells for each of the first flow and the second flow;
   aligned queues that store the aligned cells in sequence for the respective distributing parts and the respective flows, and
   a mechanism that selects the aligned queue storing the packet end cell among the aligned queues, takes out cells from the packet start cell to the packet end cell, restores the packet, and outputs the packet.

2. The multi-plane cell switch fabric system according to claim 1, wherein
   the number of serial numbers capable of being added to one cell is previously determined,
   when the number of destinations in a multicast packet exceeds the number of serial numbers capable of being added, the distributing part divides the destination information to make the number of destinations of one cell not larger than the number of serial numbers capable of being added, makes copies of the cell, the number of which is the division number of the destination information, and adds, to each of the cells after copying, the divided destination information and the serial number corresponding to each destination after the division.

3. The multi-plane cell switch fabric system according to claim 1, wherein
   in the alignment part, after a cell other than the packet end including an expected serial number arrives from an arbitrary distributing part, when a cell including an expected subsequent serial number does not arrive from the same distributing part even when a previously determined period elapses, or a cell other than the expected subsequent serial number arrives from all the exchange parts with respect to the same distributing part, the expected subsequent serial number is neglected, the expected serial number is increased, and when the expected serial number reaches a maximum value, the expected serial number is returned to zero or an initial value, and a packet in which the cell of the neglected serial number drops out is processed as an error packet.

4. The multi-plane cell switch fabric system according to claim 1, wherein the mechanism of aligning includes:
   queues that store cells and are provided correspondingly to the respective distributing parts and the respective exchange parts;
   an expected serial number manager that stores a previously set initial value, and manages an expected serial number for a first flow and an expected serial number for a second flow, which are for aligning the cells in accordance with the serial numbers, and
   a comparison section refers to the destination bitmap stored in each of the queues, determines whether a flow is the first flow or the second flow based on the combination pattern of the two bits including the bit corresponding to its own alignment part, and (a) in a case of the first flow, compares the serial number included in the cell with the expected serial number for the first flow in the expected serial number manager, takes out the identical cell from the queue, stores it in the aligned queue for the first flow, increases the expected serial number for the first flow in the expected serial number manager, and returns the expected serial number to zero or the initial value when it reaches a maximum value, and (b) in a case of the second flow, compares the serial number included in the cell with the expected serial number for the second flow in the expected serial number manager, takes out the identical cell from the queue, stores it in the aligned queue for the second flow, increases the expected serial number for the second flow in the expected serial number manager, and returns the expected serial number to zero or the initial value when it reaches a maximum value.

5. The multi-plane cell switch fabric system according to claim 1, wherein
each of M (M is an integer of 2 or more) distributing parts includes j (j is an integer of 2 or more) input ports,
each of N (N is an integer of 2 or more) alignment parts includes i (i is an integer of 2 or more) output ports,
the distributing part inputs a packet including first destination bitmap of N×i bits indicating the alignment part as the destination and the output port, takes a logical sum of the first destination bitmap for every i bits corresponding to the alignment part to generate an N-bit second destination bitmap, adds the second destination bitmap to the divided cell and outputs it to the exchange part,
the exchange part transmits the cell to the alignment part in accordance with the second destination bitmap, and
the alignment part aligns the received cells to restore the packet, refers to the first destination bitmap of N×i bits included in the restored packet, determines one or a plurality of output destinations among the i output ports of its own alignment part, and outputs the restored packet.

6. A multi-plane cell switch fabric system including a plurality of exchange parts to respectively and asynchronously perform data exchange, wherein
a distributing part as an input of the switch fabric includes:
a mechanism that divides a variable length packet into fixed length cells and adds a destination bitmap indicating an identifier of the distributing part and an alignment part of a destination to the cell, the bits of the destination bitmap corresponding respectively to the alignment parts, and each bit indicating that a cell is transmitted to the alignment part corresponding to the bit if the bit value is 1;
a mechanism that manages serial numbers indicating a sequence of cells for each of three kinds of flows for each of a plurality of combinations of two destinations, the three kinds of flows being defined for each of the combinations of the two destinations by three kinds of combination patterns of 01, 10 and 11 among combination patterns of the two bits of the destination bitmap;
a mechanism that adds a plurality of serial numbers corresponding to the destinations within a specified range; and
a mechanism that outputs the cells to the exchange part, further wherein
each of the exchange parts of the multi-plane cell switch fabric system includes a mechanism that adjusts an output for each of the destinations in cell units while transmission sequence between cell groups of the same transmission source is kept, and
in the alignment part receiving the cells via the respective exchange parts of the multi-plane cell switch fabric system, the cells are aligned in accordance with the serial numbers.

* * * * *